United States Patent
Kanda et al.

[11] Patent Number: 6,061,145
[45] Date of Patent: May 9, 2000

[54] IMAGE PROCESSING APPARATUS AND METHOD USING DOT PATTERNS

[75] Inventors: Hidehiko Kanda, Kawasaki; Naoji Otsuka; Kentaro Yano, both of Yokohama; Kiichiro Takahashi, Kawasaki; Hitoshi Nishikori, Inagi; Osamu Iwasaki, Tokyo; Daigoro Kanematsu, Kawasaki, all of Japan

[73] Assignee: Canon Kabushiki Kaisha, Tokyo, Japan

[21] Appl. No.: 08/920,864

[22] Filed: Aug. 29, 1997

[30] Foreign Application Priority Data

Aug. 29, 1996 [JP] Japan .................................. 8-228190
Dec. 27, 1996 [JP] Japan .................................. 8-350205

[51] Int. Cl.$^7$ .......................... G06K 15/02; H04N 1/409
[52] U.S. Cl. ......................... 358/1.9; 358/502; 382/269
[58] Field of Search .................................... 395/109, 102; 382/251, 266, 267, 269, 300, 298; 358/447, 448, 451, 462, 1.9, 1.2, 502

[56] References Cited

U.S. PATENT DOCUMENTS 4,847,641   7/1989  Tung .
5,454,052   9/1995  Kojima ..................................... 382/266
5,721,793   2/1998  Ushida et al. .......................... 382/300
5,875,268   2/1999  Miyake .................................... 382/269

FOREIGN PATENT DOCUMENTS 2-112966   4/1990  Japan .............................. B41J 2/248

*Primary Examiner*—Scott Rogers
*Attorney, Agent, or Firm*—Fitzpatrick, Cella, Harper & Scinto

[57] ABSTRACT

The present invention relates to an image processing method and an image processing apparatus, and an object thereof is to improve resolution and also suppress indention of contour, thereby improving image quality. In order to achieve the object in a case where multi-gradation image data is quantized to be converted into quantized pixel patterns, a smoothing portion of a quantized image is detected and a contour of the quantized image is corrected by interpolating pixels of the detected smoothing portion the quantized pixel pattern of the smoothing portion in the detected quantized image is replaced by a pixel pattern for smoothing stored in a memory.

13 Claims, 25 Drawing Sheets

SMOOTHED IMAGE

FIG. 3A  FIG. 3B  FIG. 3C  FIG. 3D
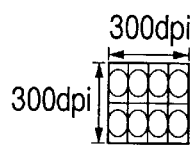  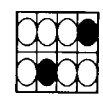 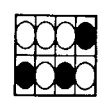
FIG. 3E  FIG. 3F  FIG. 3G  FIG. 3H
  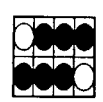 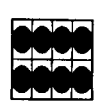
QUANTIZED PIXEL PATTERNS
FIG. 3I  FIG. 3J  FIG. 3K  FIG. 3L
  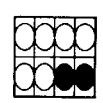 
FIG. 3M  FIG. 3N  FIG. 3O  FIG. 3P
  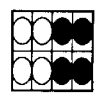 
PIXEL PATTERNS FOR SMOOTHING
● DOT
○ NO DOT

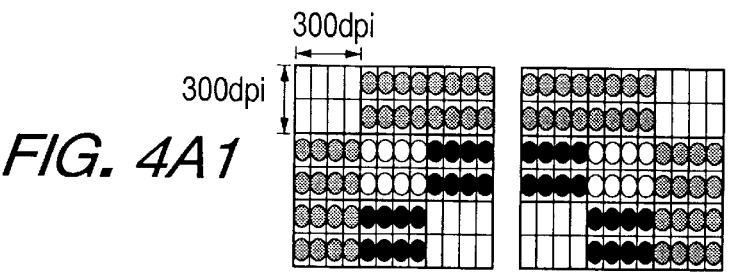
FIG. 4A1  FIG. 4A2
FIG. 4A3  FIG. 4A4
FIG. 4B1  FIG. 4B2
FIG. 4B3  FIG. 4B4
FIG. 4C1  FIG. 4C2
FIG. 4C3  FIG. 4C4
 PIXEL PATTERN OF FIG. 3H    PIXEL PATTERNS OF FIG. 3A OR FIGS. 3I TO 3P
 PIXEL PATTERN OF FIG. 3A    ALL PIXEL PATTERNS

EIGHT-LEVEL QUANTIZED PIXEL

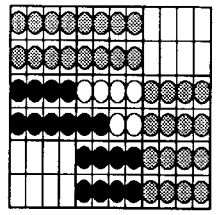
FIG. 6A1 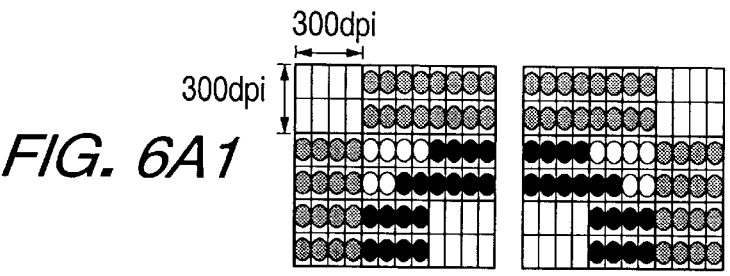 FIG. 6A2
FIG. 6A3 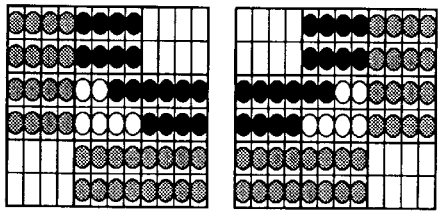 FIG. 6A4
FIG. 6B1 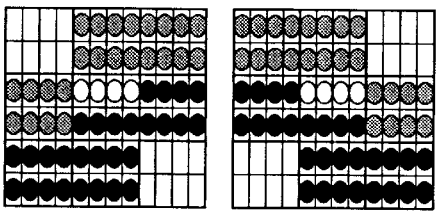 FIG. 6B2
FIG. 6B3 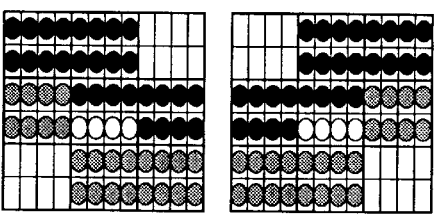 FIG. 6B4
FIG. 6C1 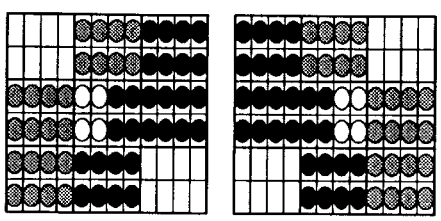 FIG. 6C2
FIG. 6C3 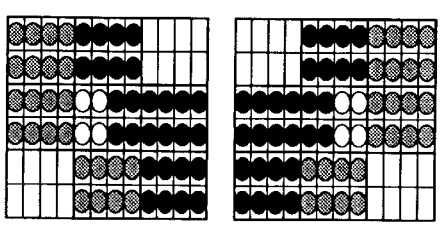 FIG. 6C4
 PIXEL PATTERN OF FIG. 3H    PIXEL PATTERNS OF FIG. 3A OR FIGS. 3I TO 3P
 ALL PIXEL PATTERNS

SMOOTHED IMAGE

EIGHT-LEVEL QUANTIZED IMAGE

FIG. 9A
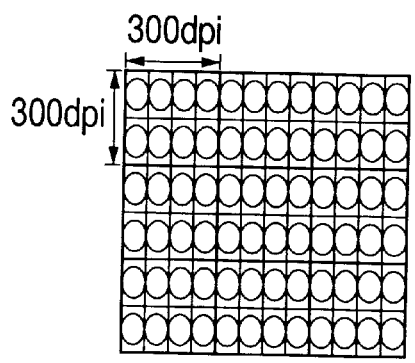 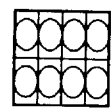 PIXEL PATTERN OF FIG. 3A
FIG. 9B
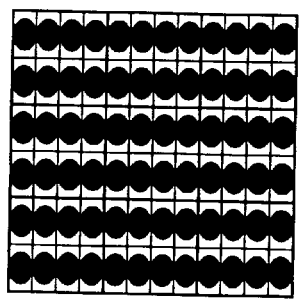 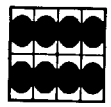 PIXEL PATTERN OF FIG. 3H

PORTIONS COINCIDED IN PRIMARY DETECTION

SMOOTHED IMAGE

NINE-LEVEL QUANTIZED PIXEL PATTERNS (FOR C, M, Y)

● DOT
○ NO DOT

FOUR-LEVEL QUANTIZED PIXEL PATTERNS (FOR Bk)

PIXEL PATTERNS FOR SMOOTHING

● DOT
○ NO DOT

FIG. 16A
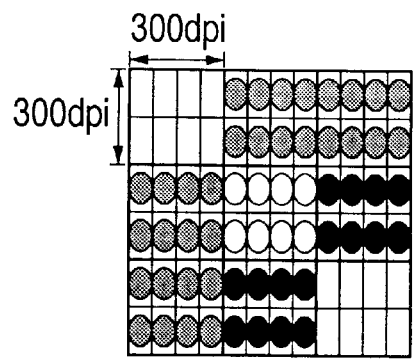
FIG. 16B
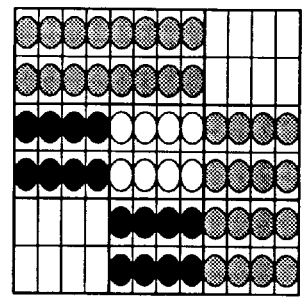
FIG. 16C
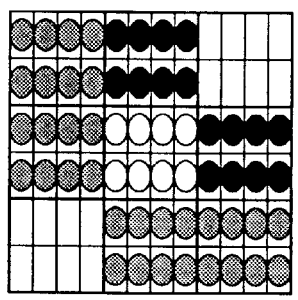
FIG. 16D
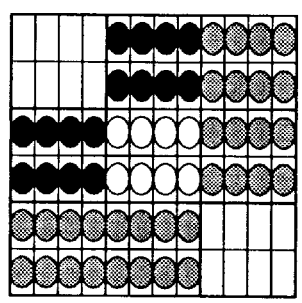
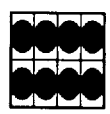 PIXEL PATTERN OF FIG. 15D
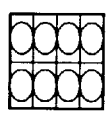 PIXEL PATTERN OF FIG. 15A
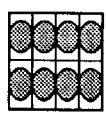 PIXEL PATTERN OF FIG. 15A OR FIGS. 15E TO 15P
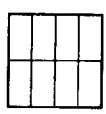 ALL PIXEL PATTERNS

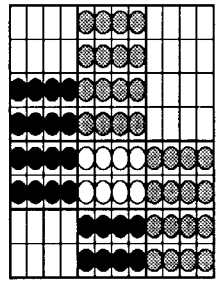
FIG. 17A 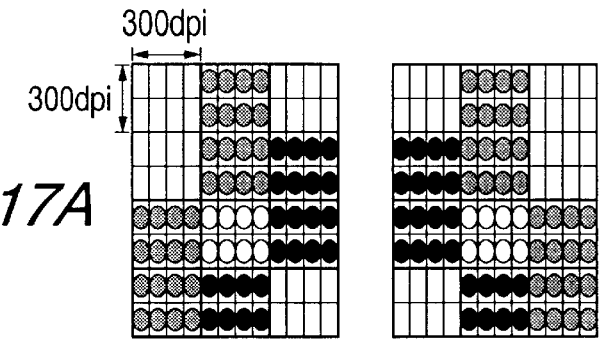 FIG. 17B
FIG. 17C 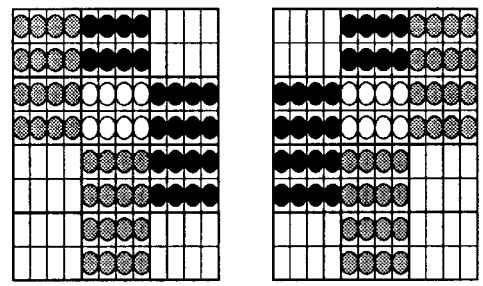 FIG. 17D
FIG. 17E 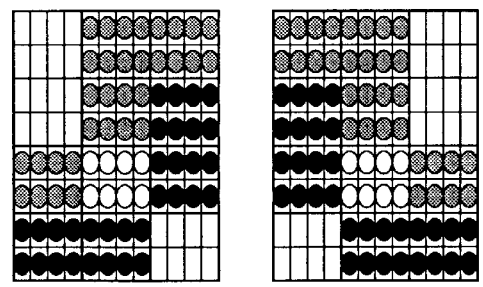 FIG. 17F
FIG. 17G 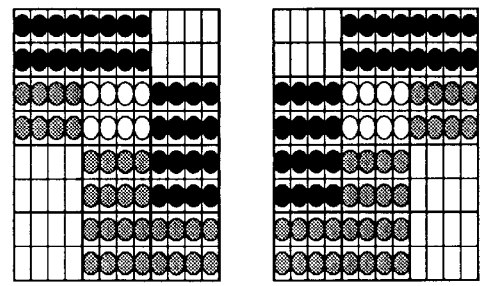 FIG. 17H
 PIXEL PATTERN OF FIG. 15D    PIXEL PATTERN OF FIG. 15A OR FIGS. 15E TO 15P
 PIXEL PATTERN OF FIG. 15A    ALL PIXEL PATTERNS

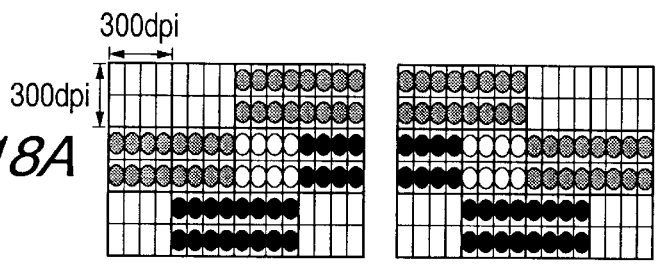
FIG. 18A  FIG. 18B
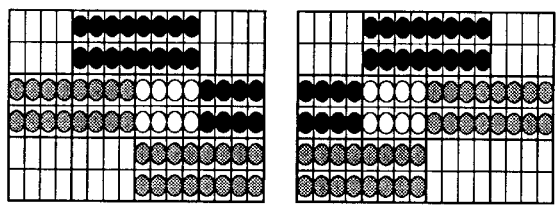
FIG. 18C  FIG. 18D
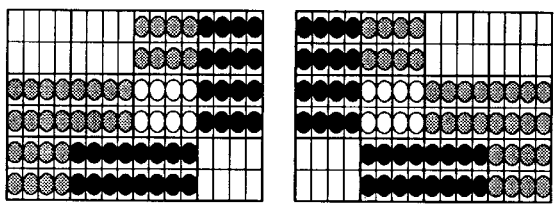
FIG. 18E  FIG. 18F
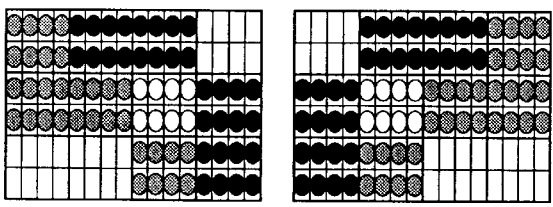
FIG. 18G  FIG. 18H
 PIXEL PATTERN OF FIG. 15H
 PIXEL PATTERN OF FIG. 15A OR FIGS. 15E TO 15P
 PIXEL PATTERN OF FIG. 15A
 ALL PIXEL PATTERNS

FOUR-LEVEL QUANTIZED BLACK IMAGE

FIG. 20A
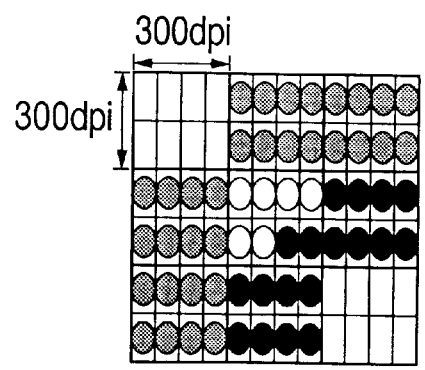
FIG. 20B
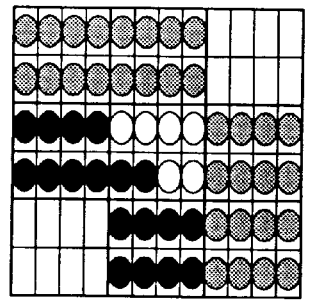
FIG. 20C
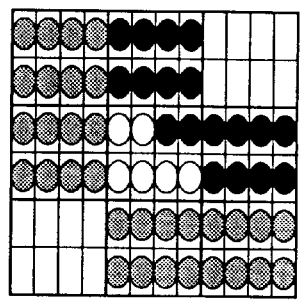
FIG. 20D
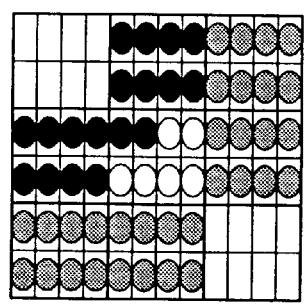
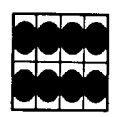 PIXEL PATTERN OF FIG. 15D
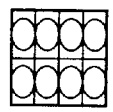 PIXEL PATTERN OF FIG. 15A
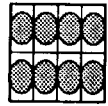 PIXEL PATTERN OF FIG. 15A OR FIGS. 15E TO 15P
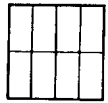 ALL PIXEL PATTERNS

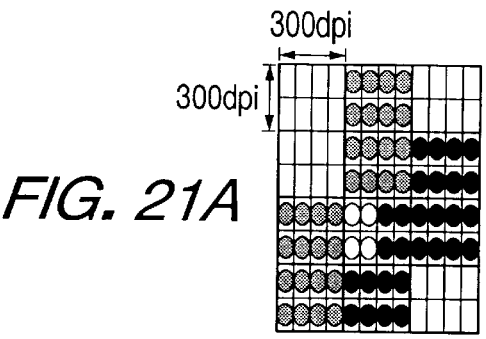
FIG. 21A
FIG. 21B

 PIXEL PATTERN OF FIG. 15D
 PIXEL PATTERN OF FIG. 15A OR FIGS. 15E TO 15P
 PIXEL PATTERN OF FIG. 15A
 ALL PIXEL PATTERNS

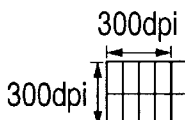
FIG. 22A 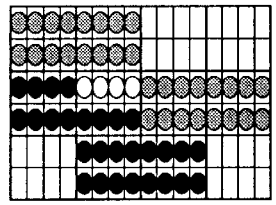 FIG. 22B
FIG. 22C 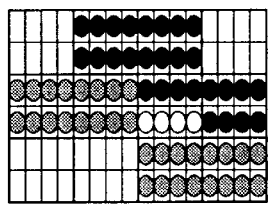 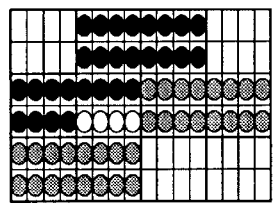 FIG. 22D
FIG. 22E 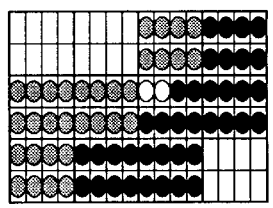 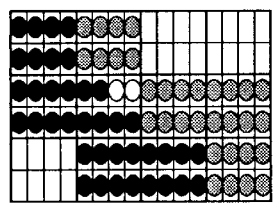 FIG. 22F
FIG. 22G 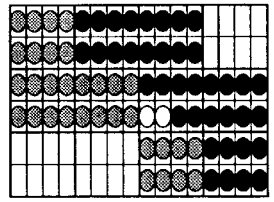 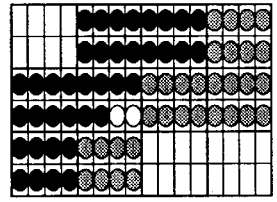 FIG. 22H
 PIXEL PATTERN OF FIG. 15H   PIXEL PATTERN OF FIG. 15A OR FIGS. 15E TO 15P
 PIXEL PATTERN OF FIG. 15A   ALL PIXEL PATTERNS

SMOOTHED BLACK IMAGE

FIG. 24A  FIG. 24B  FIG. 24C
FIG. 24D  FIG. 24E
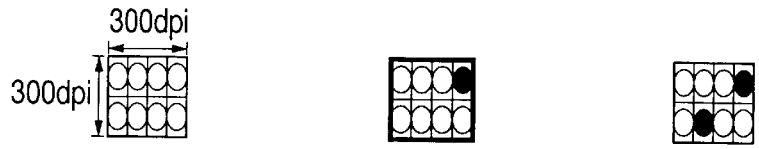
FIVE-LEVEL QUANTIZED PIXEL PATTERNS
FIG. 24B  FIG. 24F  FIG. 24G  FIG. 24H
FIG. 24I  FIG. 24J  FIG. 24K  FIG. 24L
FIG. 24M  FIG. 24N  FIG. 24O  FIG. 24P
PIXEL PATTERNS FOR SMOOTHING
● DOT
○ NO DOT

FIG. 25
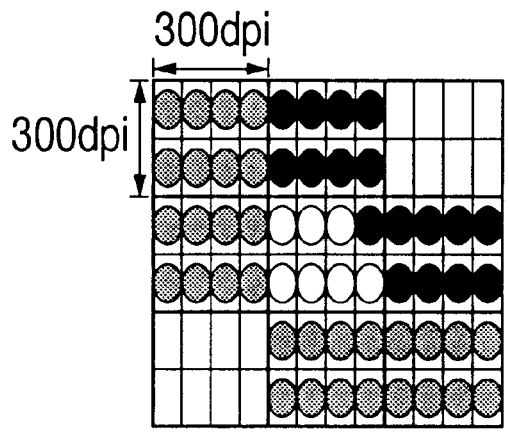
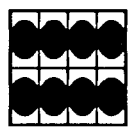 PIXEL PATTERN OF FIG. 24E
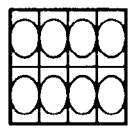 PIXEL PATTERN OF FIG. 24A
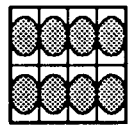 PIXEL PATTERN OF FIG. 24A AND 24B OR FIGS. 24F TO 24P
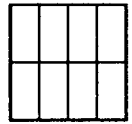 ALL PIXEL PATTERNS
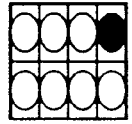 PIXEL PATTERN OF FIG. 24B

FIG. 26A
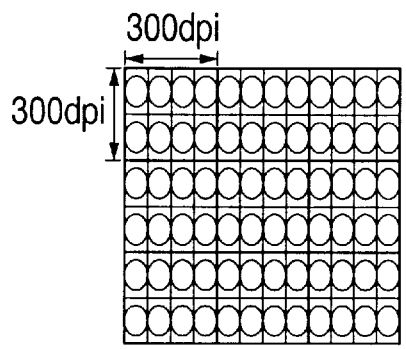
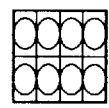 PIXEL PATTERN OF FIG. 15A
FIG. 26B
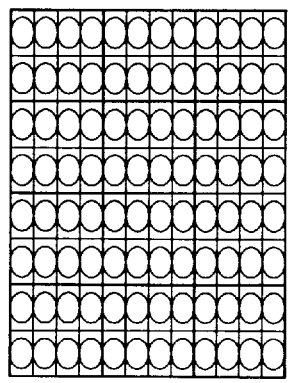
FIG. 26C
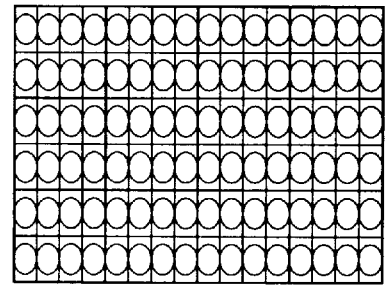

IMAGE PROCESSING APPARATUS AND METHOD USING DOT PATTERNS

BACKGROUND OF THE INVENTION

1. Field of the Invention

The present invention relates to image processing apparatus and method which use a recording method based on area gradation and a recording method for performing visual smoothing.

2. Related Background Art

In recent years, office automation (OA) apparatuses such as a personal computer, a word processor and the like have been widely used, and apparatuses of a number of systems have been also developed as apparatuses to print out image information and the like inputted by these OA apparatuses. In these apparatuses, a recording apparatus of a dot matrix system such as an inkjet system, a wire dot system, a thermal system or the like is the recording apparatus of a digital recording system which is most used at present, because this apparatus is relatively cheap and can be easily made compact in size.

In the recording apparatus of the digital recording system, since analog gradation expressing is difficult in unit of dot, a pseud halftone is expressed in an area where a plurality of dots cover a paper surface.

Further, in image forming by the recording apparatus of the dot matrix system, since an image is formed by combining the dots with others, image quality is sometimes deteriorated because an indention (or sawtooth) phenomenon occurs in a contour such as an oblique line portion of the image. In the part of the recording apparatus of the dot matrix system which intends to perform extremely high-quality outputting, a countermeasure to relieve the indention phenomenon is provided as shown in Japanese Patent Application Laid-Open No. 2-112966. That is, in order to relieve the sawtooth phenomenon, a plurality kinds of matching detection patterns of (n×m) pixel size which are used to detect an indention portion and have been already set are compared with an original image. Then, to a portion of the original image at which the original image coincides with the matching detection pattern, an interpolating process is performed in accordance with a rule inherently set for such the matching detection pattern.

However, in the conventional interpolating process of the original image for relieving the indention phenomenon, since it is necessary to newly provide interpolating pixel data (i.e., matching detection pattern), a capacity of a memory increases, whereby it occurs problems that a cost increases and a processing time prolongs.

Further, if multi-gradation input image data is quantized into ternary or more data, it is very difficult to improve gradation (or tonality) by expressing the halftone of one pixel with use of the plurality of dots of which hit positions are different from others and simultaneously to suppress the indention phenomenon on the contour of the image. Namely, the gradation can be improved by quantizing the multi-gradation input image data into the ternary or more data, but such the quantizing does not at all affect the indention phenomenon on the contour and thus does not improve resolution.

SUMMARY OF THE INVENTION

In consideration of the above-described conventional problems, an object of the present application is to provide image processing apparatus and method which realize improvement in gradation (or tonality) of an image and smooth in a contour portion of a character, a line image or the like, with suppression of increase in cost and deterioration in processing speed which occur when a capacity of a memory medium increases.

In order to achieve the above object, according to the present application, it is disclosed an image processing apparatus comprising:

input means for inputting multi-level image data;

quantizing means for quantizing the multi-level image data and generating N-level (N×3) image data; and converting means for converting the N-level image data, wherein the N-level image data corresponds to dot patterns in accordance with a level of the N-level image data, and the converting means converts the N-level image data based on an arrangement of the dot pattern.

Further, it is disclosed an image processing method comprising the steps of:

inputting multi-level image data;

quantizing the multi-level image data and generating N-level (N×3) image data; and converting the N-level image data, wherein the N-level image data corresponds to dot patterns in accordance with a level of the N-level image data, and the converting of the N-level image data in the converting step is performed based on an arrangement of the dot pattern.

An another object of the present application is to obtain satisfactory gradation and resolution in a color image.

In order to achieve the above object, according to the present application, it is disclosed an image processing apparatus comprising:

quantizing means for quantizing input multi-level image data into N-level (N×3) image data; and smoothing means for smoothing an image on the basis of the N-level image data quantized by the quantizing means,
    wherein there are provided color image data including a pixel pattern quantized by the quantizing means as pixel information, and color image data including the pixel pattern quantized by the quantizing means and a pixel pattern for smoothing the image by the smoothing means as pixel information.

Further, it is disclosed an image processing method comprising the steps of:

quantizing input multi-level image data into N-level (N×3) image data; and smoothing an image on the basis of the quantized N-level image data,
    wherein there are provided color image data including a pixel pattern quantized in the quantizing step as pixel information, and color image data including the quantized pixel pattern and a pixel pattern for smoothing the image as pixel information.

Other objects and embodiments of the present invention will become apparent from the following detailed description based on the accompanying drawings and the description of the claims.

BRIEF DESCRIPTION OF THE DRAWINGS

FIGS. 3A, 3B, 3C, 3D, 3E, 3F, 3G, 3H, 3I, 3J, 3K, 3L, 3M, 3N, 3O and 3P are views for explaining quantized pixel patterns and pixel patterns for smoothing in the first embodiment of the present invention;

FIGS. 4A1, 4A2, 4A3, 4A4, 4B1, 4B2, 4B3, 4B4, 4C1, 4C2, 4C3 and 4C4 are views for explaining detection patterns which are used to detect smoothing portions in the first embodiment of the present invention;

FIGS. 6A1, 6A2, 6A3, 6A4, 6B1, 6B2, 6B3, 6B4, 6C1, 6C2, 6C3 and 6C4 are views for explaining patterns which are replaced by pixel patterns having matrices of which central portions are smoothed respectively, after coincidence is detected by the detection patterns in FIGS. 4A1, 4A2, 4A3, 4A4, 4B1, 4B2, 4B3, 4B4, 4C1, 4C2, 4C3 and 4C4;

FIGS. 9A and 9B are views for explaining patterns to primarily detect presence or absence of a contour of the image in the second embodiment of the present invention;

FIGS. 16A, 16B, 16C and 16D are views for explaining detection patterns which are composed of matrices respectively having (3×3) pixel size and used to detect a smoothing portion in the fourth embodiment of the present invention;

FIGS. 17A, 17B, 17C, 17D, 17E, 17F, 17G and 17H are views for explaining detection patterns which are composed of matrices respectively having (3×4) pixel size and used to detect the smoothing portion in the fourth embodiment of the present invention;

FIGS. 18A, 18B, 18C, 18D, 18E, 18F, 18G and 18H are views for explaining detection patterns which are composed of matrices respectively having (4×3) pixel size and used to detect the smoothing portion in the fourth embodiment of the present invention;

FIGS. 20A, 20B, 20C and 20D are views for explaining patterns which are replaced by the pixel patterns for smoothing, after coincidence is detected by the detection patterns in FIGS. 16A, 16B, 16C and 16D;

FIGS. 21A, 21B, 21C, 21D, 21E, 21F, 21G and 21H are views for explaining patterns which are replaced by the pixel patterns for smoothing, after coincidence is detected by the detection patterns in FIGS. 17A, 17B, 17C, 17D, 17E, 17F, 17G and 17H;

FIGS. 22A, 22B, 22C, 22D, 22E, 22F, 22G and 22H are views for explaining patterns which are replaced by the pixel patterns for smoothing, after coincidence is detected by the detection patterns in FIGS. 18A, 18B, 18C, 18D, 18E, 18F, 18G and 18H;

FIGS. 24A, 24B, 24C, 24D, 24E, 24F, 24G, 24H, 24I, 24J, 24K, 24L, 24M, 24N, 24O and 24P are views for explaining patterns which are composed of quantized pixels and pixels for smoothing in a fifth embodiment of the present invention;

FIG. 25 is a view for explaining a pattern which is replaced by a pixel pattern for smoothing, after coincidence is detected by the detection pattern in FIG. 16C, in a sixth embodiment of the present invention; and FIGS. 26A, 26B and 26C are views for explaining patterns to primarily detect presence or absence of a contour portion of a character or the like in a seventh embodiment of the present invention.

DETAILED DESCRIPTION OF THE PREFERRED EMBODIMENTS

Hereinafter, the embodiments of the present invention will be explained in detail with reference to the accompanying drawings.

[First Embodiment]

Figure 1:
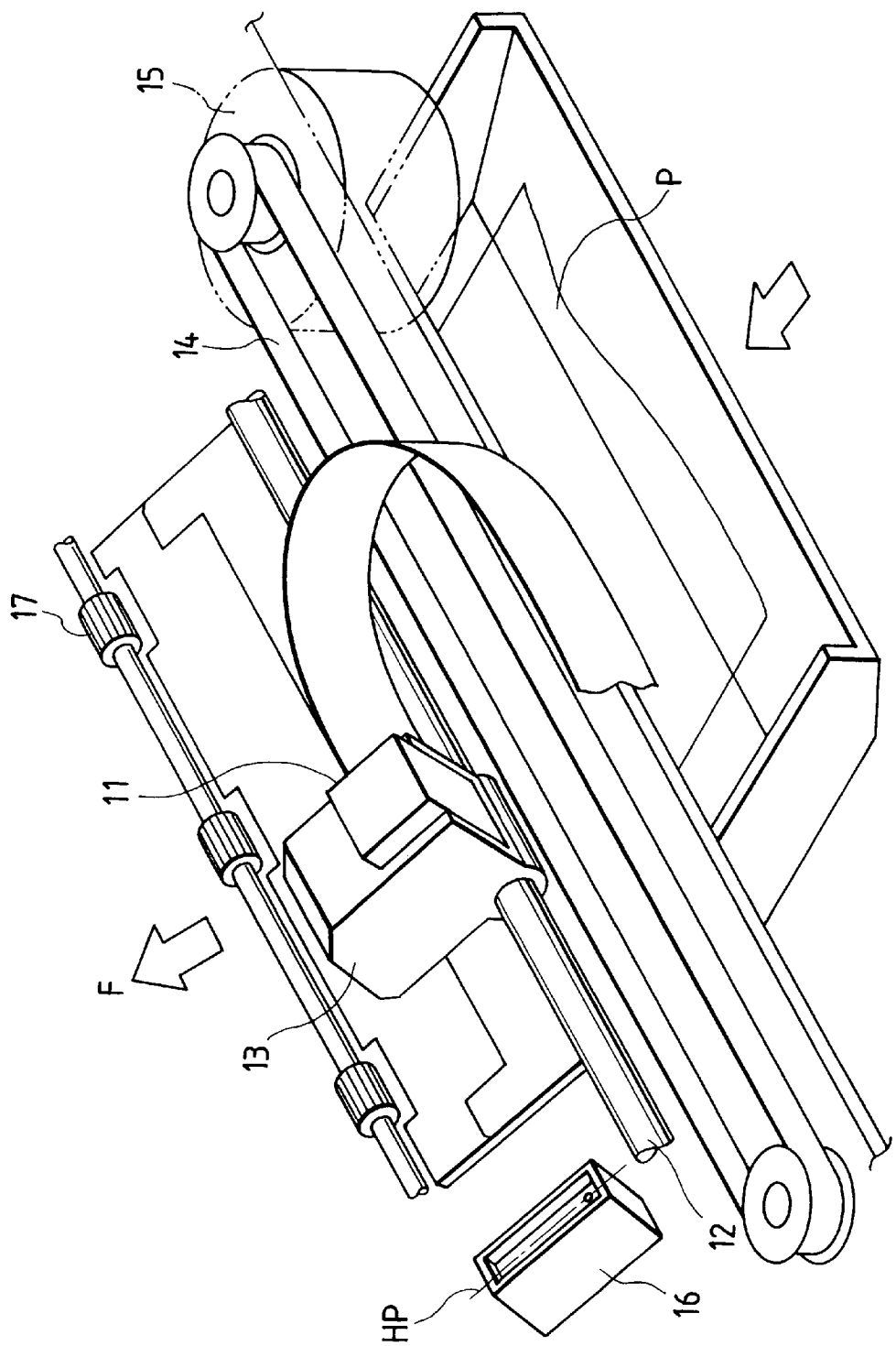
FIG. 1 is a perspective view showing structure of a main portion of an inkjet recording apparatus according to a first embodiment of the present invention.

FIG. 1 is a perspective view showing structure of a main portion of an inkjet recording apparatus according to a first embodiment of the present invention;

In FIG. 1, an inkjet unit 11 has a recording head on which a discharge-nozzle row for discharging or ejecting ink is arranged. The inkjet unit 11 is mounted on a carriage 13. For example, a recording material P consisting of a recording paper, a plastic thin board or the like is put in and supported by paper discharge rollers 17 through a carrier roller (not shown), and driven by a carrier motor (not shown) to be fed in a direction indicated by an arrow F. The carriage 13 is guided and supported by a guide shaft 12 and an encoder (not shown). Further, the carriage 13 is reciprocated along the guide shaft 12 by driving a carriage motor 15 through a driving belt 14.

An exothermic element (i.e., electrothermal conversion means) for producing heat energy to be used to discharge the ink is provided inside an ink discharge nozzle (i.e., liquid path) of the inkjet unit 11. In accordance with reading timing of the encoder, the exothermic element is driven based on a recording signal to cause the ink discharge nozzle to discharge the ink. Thus, an image can be formed by blowing and attaching ink droplets over the recording material P.

A recovery unit having a cap unit 16 is provided at a home position HP of the carriage 13 which is selected outside of an recording area. When no recording is performed, the carriage 13 is moved to the home position HP and an ink discharge nozzle formation plane of the inkjet unit 11 is closed by the cap unit 16. Thus, it can be prevented plugging of the nozzle which is caused by fixing of ink, fixing of extraneous substances such as dust, paper particles or the like due to evaporation of an ink solvent.

A capping function of the cap unit 16 is utilized in an preliminary discharge mode in which the ink is discharged to the cap unit 16 distant from the ink discharge nozzle so as to eliminate defective discharging and plugging of the ink discharge nozzle of which recording frequency is low, which defective discharging and plugging are caused due to thickening in viscosity, fixing of ink or the like. Also, the capping function of the cap unit 16 is utilized in a discharging recovery operation in which a suction pump is driven in the capping state to suck the ink from the ink discharge nozzle for recovering the ink discharge nozzle which caused the defective discharging. In addition, by providing a cleaning blade at a position adjacent to the cap unit 16, the ink discharge nozzle formation plane of the inkjet unit 11 can be cleaned (i.e., wiping).

Figure 2:
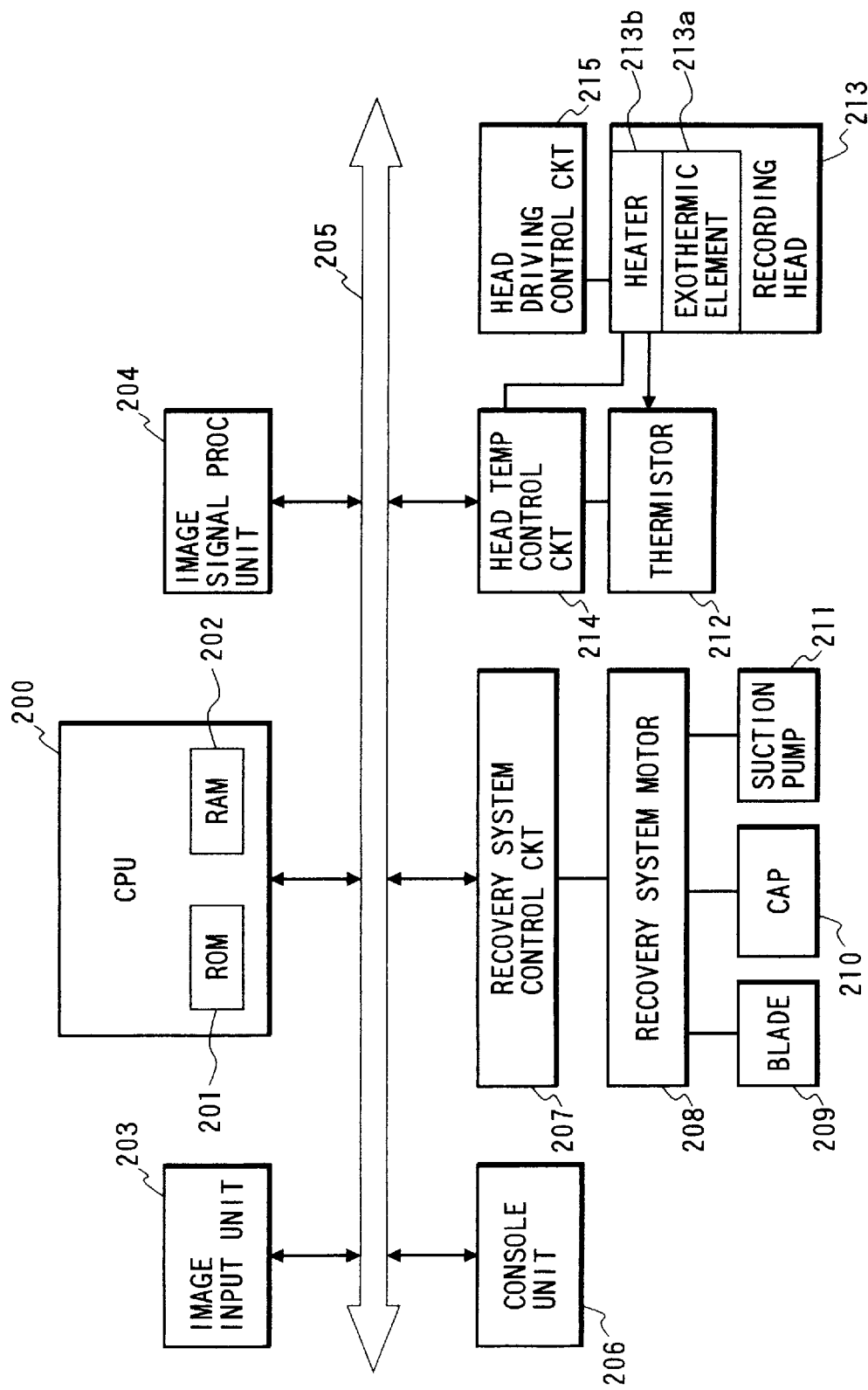
FIG. 2 is a block diagram showing structure of a control circuit which is provided in the inkjet recording apparatus to which the present invention is applied.

FIG. 2 is a block diagram showing structure of a control circuit provided in the inkjet recording apparatus shown in FIG. 1.

In FIG. 2, components to be connected to a main bus line 205 is roughly divided into a software-system process unit and a hardware-system process unit. The software-system process unit includes an image input unit 203, an image signal process unit 204 corresponding to the image input unit 203, a central processing unit (CPU) 200 and the like which all access the main bus line 205 respectively. On the other hand, the hardware-system process unit includes a console unit 206, a recovery system control circuit 207, an inkjet head temperature control circuit 214, a head driving control circuit 215 and the like.

The CPU 200 which ordinarily has a read only memory (ROM) 201 and a random access memory (RAM) 202 renders an appropriate recording condition to input data and drives a recording head 213 to perform the recording. The ROM 201 previously stores a program to execute a head recovery timing chart, and renders a recovery condition such as a preliminary discharge condition or the like to the recovery system control circuit 207, the recording head 213, a heater 213b or the like in accordance with necessity. Further, the ROM 201 previously stores a program for executing a process based on a flow chart shown in FIG. 12 (described later).

A recovery system motor 208 drives, as well as the recording head 213, a cleaning blade 209, a cap 210 and a suction pump 211 which are opposed to and apart from the recording head 213. The head driving control circuit 215 drives an exothermic element 213a to be used to discharge the ink of the recording head 213, and thus causes the recording head 213 to perform preliminary discharging and ink discharging for actual recording.

The heater 213b is mounted on a base board of the recording head 213 on which the exothermic element 213a for ink discharging is also mounted, whereby the heater 213b can heat and adjust ink temperature in the recording head 213 at desired setting temperature. Similarly, a thermistor 212 is mounted on the base board to measure the substantial ink temperature in the recording head 213. This thermistor may be provided outside of the recording head 213, i.e., not on the base board. That is, the thermistor 212 may be provided in the vicinity of the recording head 213.

In the recording apparatus according to the first embodiment of the present invention which is structured as described above, a multi-gradation input image is represented by multi-level image data of which resolution is 300×300 dpi, and halftone of one pixel is expressed by using a plurality of dots of which positions of impact (or hit) are different from others, thereby improving gradation (or tonality). Further, a contour of the image is corrected to suppress an indention (or sawtooth) phenomenon occurred on the contour. In order to derive both such effects, the control circuit shown in FIG. 2 performs following controlling in the recording apparatus.

FIGS. 3A to 3P are views for explaining quantized pixel patterns and pixel patterns for smoothing in the first embodiment of the present invention.

There are 16 kinds of pixel patterns respectively shown in FIGS. 3A to 3P, and each pixel is composed of a (4×2) matrix. A data capacity of a memory such as the RAM 202 or the like in which the pixel patterns have been previously stored as image information is four bits. The multi-gradation input image data is quantized into the eight-level data, and then converted into the image data formed by the quantized eight-kind pixel patterns shown in FIGS. 3A to 3H. In the drawings, FIG. 3A shows the pattern including no dot, FIG. 3H shows the pattern including full of eight dots, and remaining FIGS. 3B to 3G show halftone patterns, respectively. FIGS. 3I to 3P show the eight kinds of pixel patterns for smoothing respectively including two or four dots.

FIGS. 4A1 to 4A4, 4B1 to 4B4 and 4C1 to 4C4 are views for explaining detection patterns to be used to detect the smoothing portion in the first embodiment of the present invention.

Each of these detection patterns is composed of a matrix having (3×3) pixel size which is smaller than (5×5) dots, and the 12 kinds of detection patterns respectively shown in FIGS. 4A1 to 4C4 are prepared.

Initially, the multi-gradation input image data is quantized into the eight-level data, and then converted into the quantized image data formed by the pixel patterns shown in FIGS. 3A to 3H.

FIGS. 5A to 5J are views for explaining the image which is obtained by quantizing the multi-gradation input image data into the eight-level data in the first embodiment of the present invention.

Figure 5A:
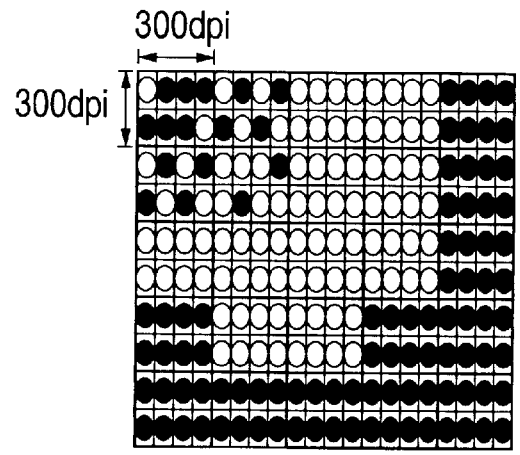
FIGS. 5A, 5B, 5C, 5D, 5E, 5F, 5G, 5H, 5I and 5J are views for explaining an image which is obtained by quantizing multi-level input image data into eightlevel image data in the first embodiment of the present invention.
Figure 5B:
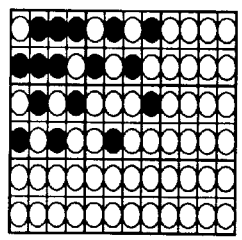
Figure 5E:
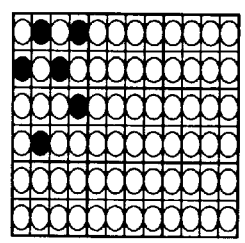
Figure 5H:
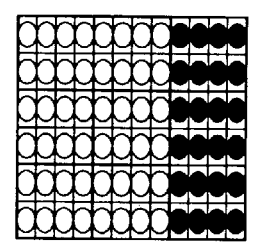
Figure 5C:
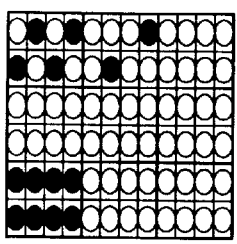
Figure 5F:
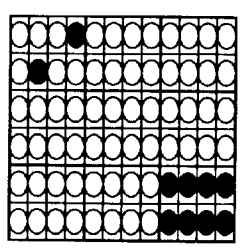
Figure 5I:
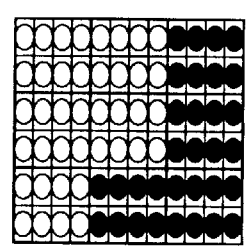
Figure 5D:
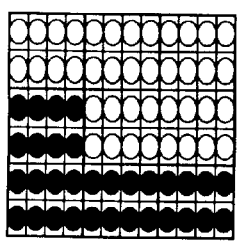
Figure 5G:
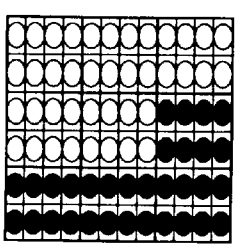
Figure 5J:
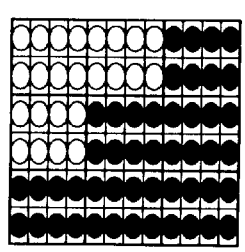

FIG. 5A shows an example of the eight-level quantized multi-gradation input image data including the matrix having (5×5) pixel size. Each pixel corresponds to either one of the quantized pixel patterns shown in FIGS. 3A to 3H. FIGS. 5B to 5J respectively show matrix portions each of which has (3×3) pixel size smaller than (5×5) dots and is composed of a part of the quantized image data shown in FIG. 5A. For example, FIG. 5B shows the (3×3) matrix portion corresponding to an upper left corner portion in FIG. 5A, and FIG. 5D shows the (3×3) matrix portion corresponding to a lower left corner portion in FIG. 5A. Further, FIG. 5G shows the (3×3) matrix portion corresponding to a central lowermost column portion in FIG. 5A, and FIG. 5I shows the (3×3) matrix portion corresponding to a central rightmost column portion in FIG. 5A.

The quantized image data shown in FIGS. 5B to 5J are checked against the 12 kinds of detection patterns including the matrices having (3×3) pixel size shown in FIGS. 4A1 to 4C4, as the image data shown in FIGS. 5B to 5J are displaced or shifted by longitudinally one pixel and laterally one pixel every checking. At that time, as shown in the matrix portions of FIGS. 5B, 5C, 5E and 5F, if the checking matrix having (3×3) pixel size includes even one halftone pixel pattern shown in FIGS. 3B to 3G, the image data is not checked against the 12 -kind detection patterns shown in FIGS. 4A1 to 4C4 and the next matrix portion is checked. In other words, the image data shown in FIGS. 5D, 5G and 5H to 5J are checked against the 12 -kind detection patterns shown in FIGS. 4A1 to 4C4. When it is detected that the image data coincides with the detection pattern, the central pixel of (3×3) dots is replaced by the smoothed pixel pattern shown in FIGS. 3I to 3P.

FIGS. 6A1 to 6A4, 6B1 to 6B4 and 6C1 to 6C4 are views each for explaining a pattern in which, after the coincidence is detected by using the 12 -kind detection patterns (shown in FIGS. 4A1 to 4C4) respectively including the matrices of (3×3) pixel size and used to detect the smoothing portion, a central portion of its matrix is replaced by the smoothed pixel.

That is, when it is detected that the matrix portion in FIG. 5D coincides with the detection pattern in FIG. 4B2, the pixel pattern in FIG. 3A having (3×3) matrix of which central portion has been quantized is replaced by the smoothed pixel pattern in FIG. 3N to obtain the pattern as in FIG. 6B2. Then, the operation advances to the detection of next matrix portion.

When it is detected that the matrix portion in FIG. 5G coincides with the detection pattern in FIG. 4B1, the pixel pattern in FIG. 3A having (3×3) matrix of which central portion has been quantized is replaced by the smoothed pixel pattern in FIG. 3N to obtain the pattern as in FIG. 6B1. Then, the operation advances to the detection of next matrix portion. The coincidence of the matrix portion in FIG. 5H with the detection patterns in FIGS. 4A1 to 4C4 is not detected.

In the detection of next matrix portion, when it is detected that the matrix portion in FIG. 5I coincides with the detection pattern in FIG. 4C1, the pixel pattern in FIG. 3A having (3×3) matrix of which central portion has been quantized is replaced by the smoothed pixel pattern in FIG. 3O to obtain the pattern as in FIG. 6C1. Then, the operation advances to the detection of next matrix portion. The coincidence of the matrix portion in FIG. 5J with the detection patterns in FIGS. 4A1 to 4C4 is not detected.

Figure 7:
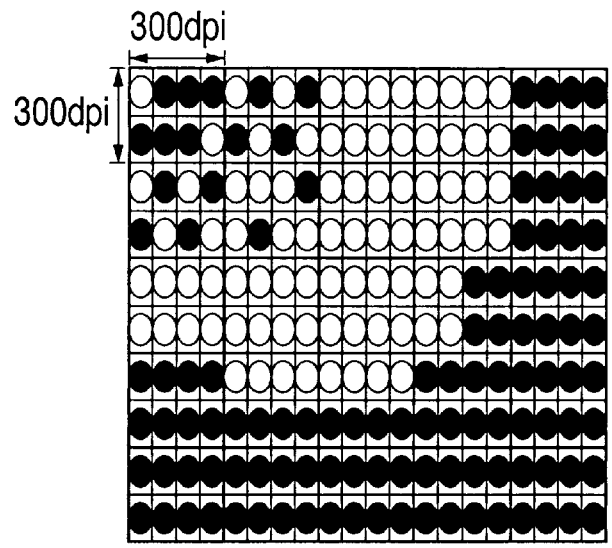
FIG. 7 is a view for explaining the image which is obtained by smoothing the eight-level quantized image in FIGS. 5A, 5B, 5C, 5D, 5E, 5F, 5G, 5H, 5I and 5J in the first embodiment of the present invention.

FIG. 7 is a view for explaining an image which is obtained by smoothing the eight-level quantized image shown in FIGS. 5A to 5J in the first embodiment of the present invention.

In the image shown in FIG. 7, the central pixels of the patterns in FIGS. 6B2, 6B1 and 6C1 which were replaced after detecting the coincidence in such a manner as described above are positioned respectively at (2, 4), (3, 4) and (4, 3) positions in the (5×5) matrix. It can be understood from FIG. 7 that pixel interpolating is performed in which the 300×300 dpi image data is considered as the image corresponding to double resolution 600×600 dpi, and thus the contour has been corrected. The interpolating target pixel corresponds to an (2, 2) position which is obtained by eliminating upper, lower, left and right edge portions of the detection pattern of (3×3) matrix, and is the (3×3) pixel which is obtained by eliminating upper, lower, left and right edge portions in the (5×5) pixel of the image shown in FIGS. 5A to 5J.

In the present embodiment, the image information including both the quantized pixel data and the smoothed pixel data is represented by four bits. However, such the information may be represented by multibit number such as six bits, eight bits or the like. Further, the matrix other than (4×2) matrix may be used as the matrix of one pixel.

According to the present embodiment, by performing such the controlling as described above, it can be prevented that the cost increases and the processing speed deteriorates because the memory capacity increases by newly providing the interpolating pixel data (i.e., smoothed pixel data). Further, by quantizing the multi-gradation input image data into the three-level or more data, the halftone of one pixel is expressed by using the plurality of dots of which positions of impact are different from others to increase the gradation or tonality, and also the contour of the image is corrected to suppress its indention phenomenon. That is, by deriving both such the effects, the recording apparatus for realizing the high-quality image recording in the dot matrix recording system can be provided.

[Second Embodiment]

By the way, a printing rate (or ratio) of general documents is about 4 to 5% of a recording pixel area of a recording medium, and the printing rate of a halftone image such as a photograph or the like is about 20% or so. In the printing rate, since pixels to be smoothed (i.e., smoothing target pixels) are partial pixels constituting a contour of a character or the like, a smoothing target portion is extremely small in an entire recording area. For this reason, it is controlled in the present embodiment such that the area other than the smoothing target area is primarily detected so as not to perform the smoothing on such the detected area, in order to obtain the effects that halftone of one pixel is expressed by further effectively using a plurality of dots of which positions of impact are different from others to increase gradation or tonality, and also a contour of the image is corrected to suppress its indention phenomenon.

Also, the present embodiment will be explained hereinafter by using the pixel patterns shown in FIGS. 3A to 3P, the detection patterns shown in FIGS. 4A1 to 4C4, and the patterns replaced by the smoothed pixels after the detection shown in FIGS. 6A1 to 6C4.

Like the first embodiment, initially, multi-gradation input image data is quantized into eight-level data and converted into quantized image data composed of the pixel patterns shown in FIGS. 3A to 3H.

Figure 8:
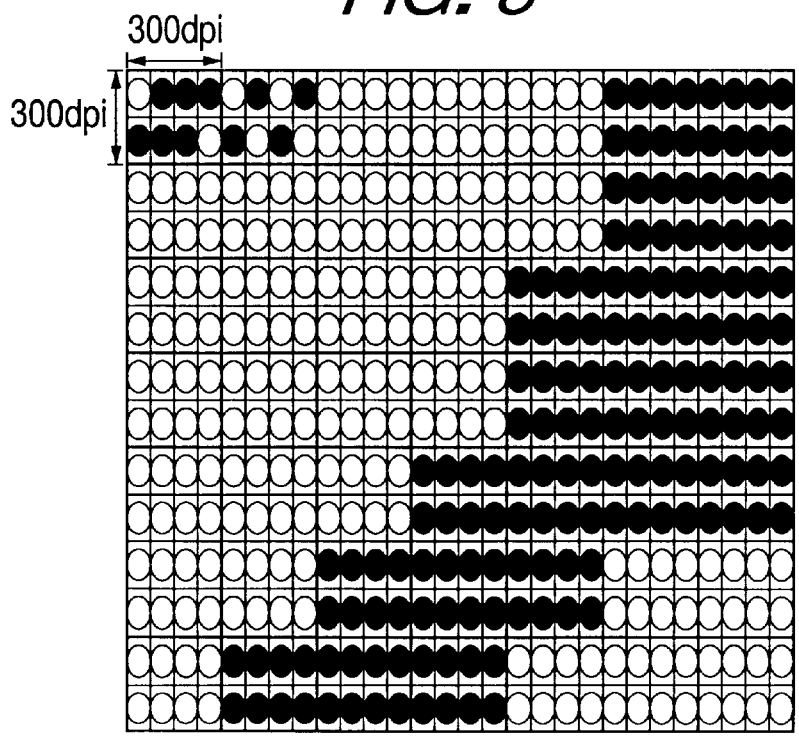
FIG. 8 is a view for explaining an image which is obtained by quantizing multi-level input image data into eight-level image data in a second embodiment of the present invention.

FIG. 8 is a view for explaining an image which is obtained by quantizing the multi-gradation input image data in the first embodiment, into eight levels.

The quantized image data of a matrix having (7×7) pixels is checked against the 12 kinds of detection patterns composed of the matrices having (3×3) pixel size, as the matrices from the (3×3) pixel matrix at the upper left portion to the matrices from the (3×3) pixel matrix at the lower right portion are respectively displaced or shifted by longitudinally one pixel and laterally one pixel, to detect a smoothing portion. However, primary detecting as explained below is performed before such detecting.

FIGS. 9A and 9B show patterns for primarily detecting presence or absence of the contour of the image in the second embodiment of the present invention. In the present embodiment, in a step of detecting the smoothing portion, the presence or absence of the contour of the character or the like in the matrix of the detection pattern is primarily detected by using the patterns shown in FIGS. 9A and 9B, whereby efficiency in the detecting step is remarkably improved.

The pattern shown in FIG. 9A includes the (3×3) pixel matrices all of which are composed of the non-dot pixel patterns in FIG. 3A. The pattern shown in FIG. 9B includes the (3×3) pixel matrices all of which are composed of the dot patterns in FIG. 3H.

Figure 10A:
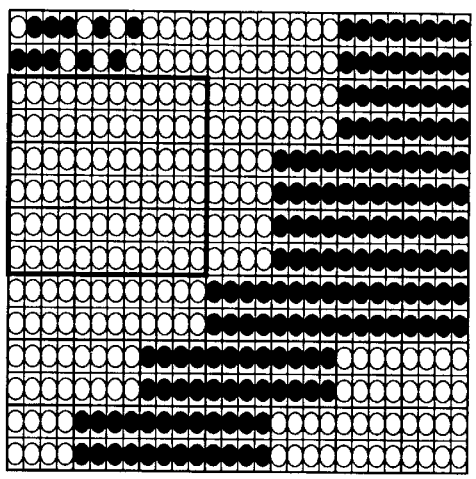
FIGS. 10A, 10B, 10C and 10D are views for explaining areas in which the image data in FIG. 8 coincides with the primary detection patterns in FIGS. 9A and 9B.
Figure 10B:
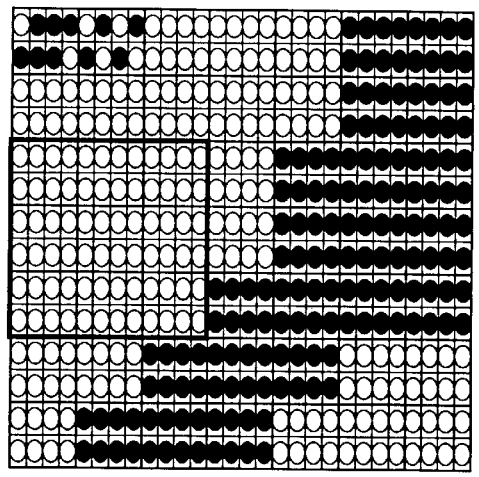
Figure 10C:
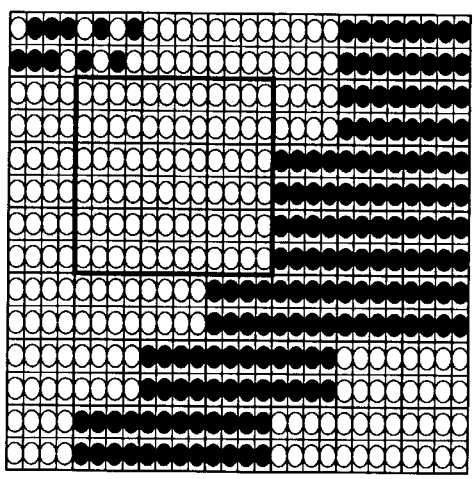
Figure 10D:
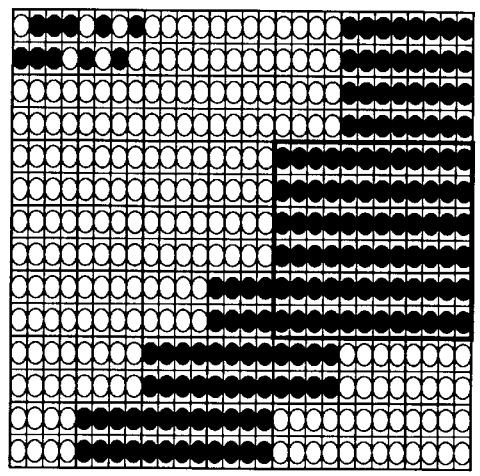

Initially, the non-dot patterns in FIG. 9A is preferentially checked against the quantized image in FIG. 8 as the pattern is displaced or shifted by longitudinally one pixel and laterally one pixel every checking. Subsequently, each pattern in FIG. 9B is similarly checked against the quantized image in FIG. 8, whereby the primarily detecting is performed. When coincidence is detected, the pattern is not checked against the detection patterns in FIGS. 4A1 to 4C4, and the primarily detecting is performed on the next matrix. In the primary detecting of the patterns shown in FIG. 9A, three areas surrounded by thick frames or borders shown in FIGS. 10A to 10C are detected in the coincidence. In the primary detecting of the patterns shown in FIG. 9B, an area surrounded by a thick frame or border shown in FIG. 10D is detected in the coincidence. Since all the dots exist or do not exist in these areas, i.e., each area does not include the contour of the character or the like, these areas are not checked against the detection patterns in FIGS. 4A1 to 4C4.

If no coincidence is detected in the primary detecting, like the first embodiment, presence or absence of the halftone pixel patterns shown in FIGS. 3B to 3G is detected. Then, if there is the halftone pixel pattern, the detecting of the 12 -kind detection patterns in FIGS. 4A1 to 4C4 is not performed and the next matrix portion is primarily detected.

Figure 11:
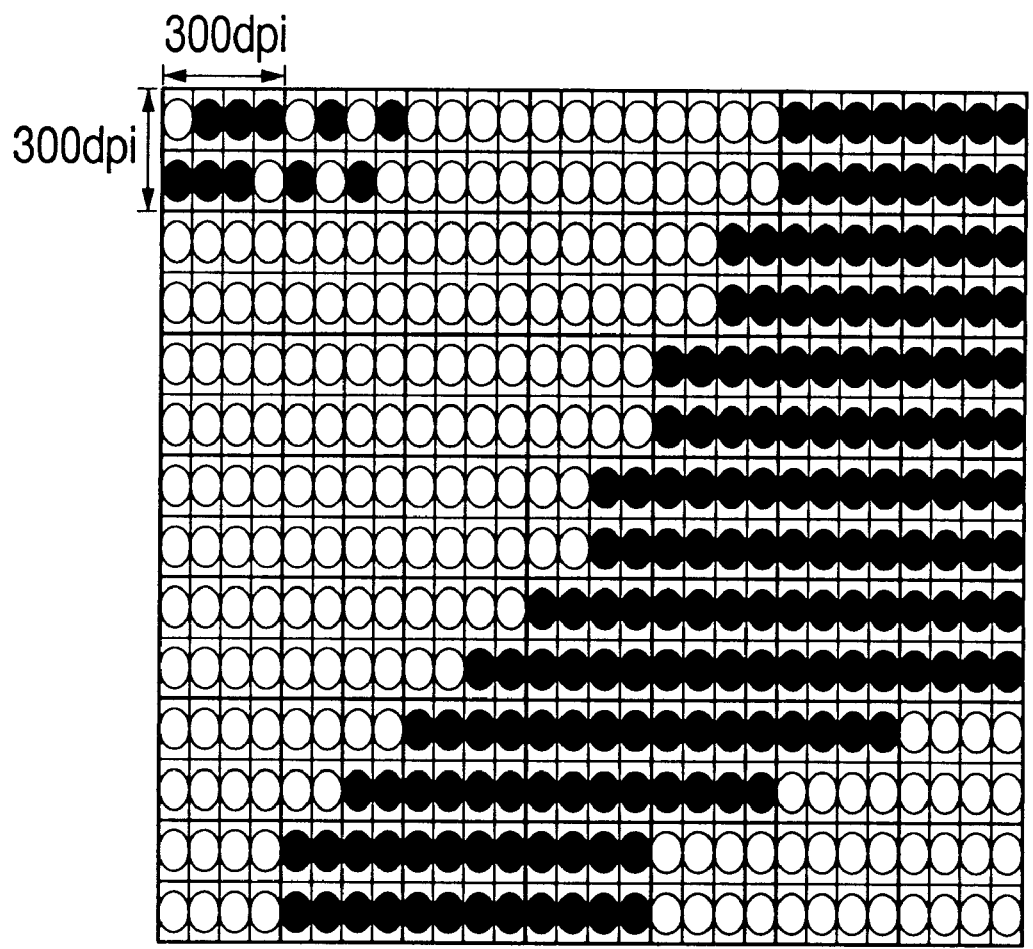
FIG. 11 is a view for explaining the image which is obtained by smoothing the eight-level quantized image in FIG. 8 in the second embodiment of the present invention.

On the other hand, if there is no halftone pixel pattern, the smoothing portion is detected. Like the first embodiment, the quantized image data is checked against the 12 -kind detection patterns in FIGS. 4A1 to 4C4. Then, like the first embodiment, when the coincidence is detected, the central pixel of the (3×3) matrix is replaced by the smoothed pixel pattern in FIGS. 3I to 3P. As above, the area not including the contour is primarily detected in the eight-level quantized image shown in FIG. 8, and other area not preliminarily detected is smoothed in the same manner as in the first embodiment, whereby the smoothed image having double resolution shown in FIG. 11 can be obtained.

The primary detecting is performed by such the controlling as described above, and the quantized image data is not checked against the detection patterns in FIGS. 4A1 to 4C4 when the coincidence is detected in the primary detecting, whereby the smoothing portion can be effectively performed. Therefore, it can be prevented that cost increases and processing speed deteriorates because a memory capacity increases by newly providing interpolating pixel data (i.e., smoothed pixel data). Further, by quantizing the multi-gradation input image data into three levels of more, the halftone of one pixel is expressed by using the plurality of dots of which positions or impact are different from others to increase the gradation or tonality, and also the contour of the image is corrected to suppress its indention phenomenon. That is, by deriving both such the effects, a recording apparatus for realizing the high-quality image recording in a dot matrix recording system can be provided.

[Third Embodiment]

In the present embodiment, it will be explained an example that a specific limitation is provided to image data to be smoothed in color multi-gradation image data. That is, as such the limitation, the image data to be smoothed is limited only to a black character. Ordinarily, six point (2 mm) to eight point (8 mm) are mainly used as sizes of the black character. Even if the size of black character is large, it is limited to extent about 72 point (24 mm). In the present embodiment, black character detecting is performed by detecting a null raster in which no data exists.

Figure 12:
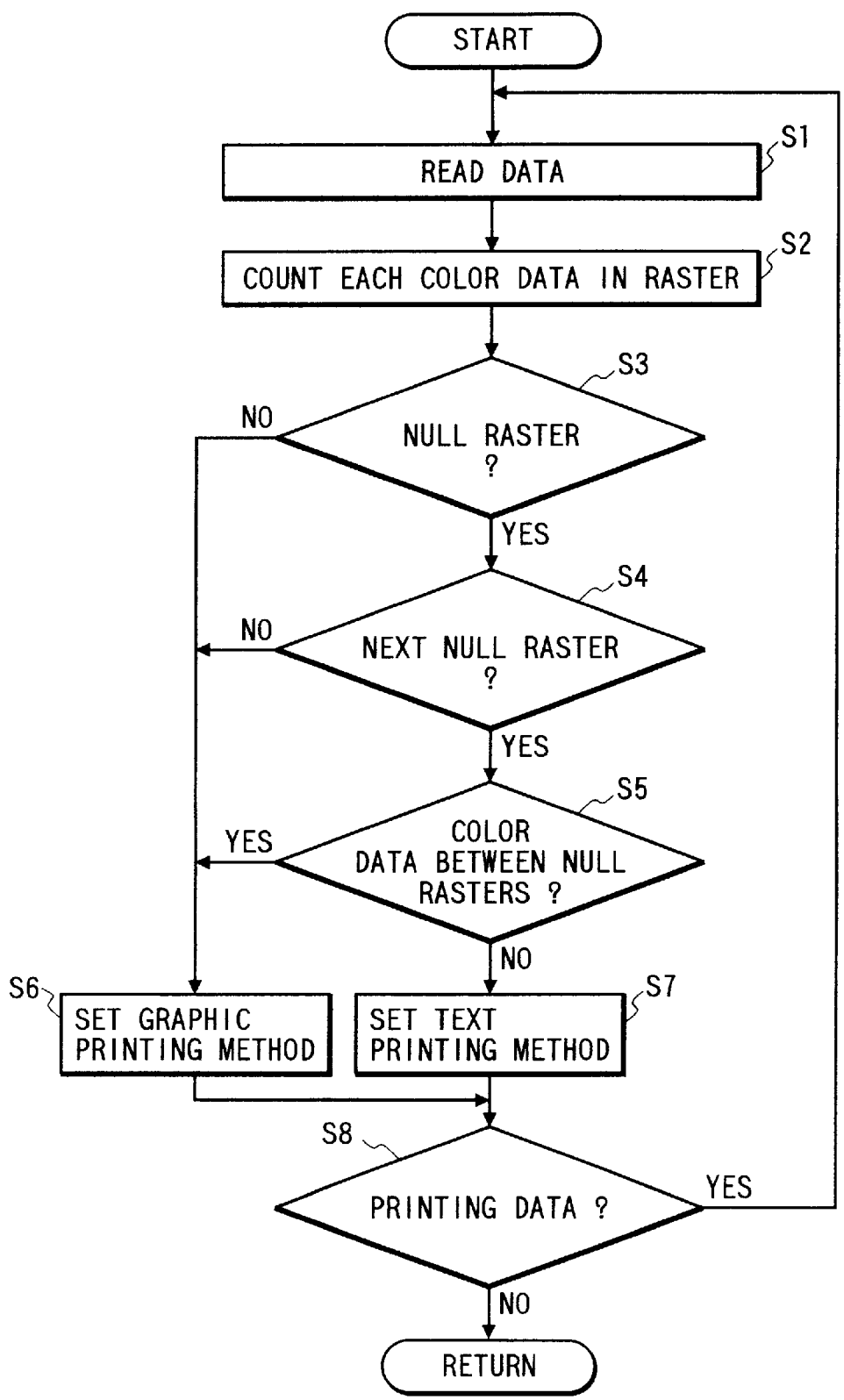
FIG. 12 is a flow chart showing a sequence to set detecting and printing methods of a black character in a third embodiment of the present invention.

FIG. 12 is a flow chart showing a black character detecting and printing method setting sequence.

Initially, in a step S1, quantized printing data is read and temporarily stored in a memory such as a RAM 202 or the like. The memory is structured to be able to independently store black, yellow, magenta and cyan data, and a capacity thereof depends on the size of the character to be extracted.

For example, if the character is extracted up to 72 point, it is necessary for the memory to store the data corresponding to 400 rasters or more at 300 dpi. If A4 longitudinal size, the capacity corresponding to 176 Kbyte or so is necessary on each color. Therefore, it is desirable to use the memory having the capacity plural times as large as a maximum length capable of being printed in one scanning according to the number of recording head nozzles. As the capacity becomes larger, the black character capable of being discriminated becomes larger. Therefore, since the mainstream of the black character size is 24 point or smaller, such the black character can be discriminated by the capacity corresponding to 136 rasters or so at 300 dpi.

In a step S2, it is counted whether the raster includes each color data, so as to raise a bit as to whether or not data exists on each color data in the raster, at the front or the rear of each raster. For this reason, it can be discriminated whether the data existing in such the raster represents black data, color data or mixture data.

In a step S3, it is detected whether or not the null raster exists. If the null raster does not exist, the image data is considered as continuous data representing connected images. Thus, the flow advances to a step S6 to set a graphic printing method. This sequence is to detect the black character which is intended to be smoothed, and the smoothing is not performed in the graphic printing method.

If the null raster exits, the flow advances to a step S4 to detect whether or not a next null raster exits. If the next null raster does not exist, any judging is impossible within the judged range, whereby the step advances to the step S6 to set the graphic printing method.

If the next null raster exits, the flow advances to a step S5 to discriminate whether or not color data exits between the detected null rasters. If the color data exits, the image data is considered as no text, whereby the graphic printing method is set in the step S6.

If the color data does not exist, the image data is considered as the black character, and thus the flow advances to a step S7 to set a text printing method. Then, the printing is performed by means of the smoothing described in the first or second embodiment of the present invention.

If the graphic printing method or the text printing method is set, the flow advances to a step S8 to discriminate whether or not printing data exits. If the printing data exits, the flow returns to the step S1 to again repeat the black character detecting and printing method setting sequence. On the other hand, if the printing data does not exit, this sequence terminates.

As explained above, the black character detecting is performed by detecting presence or absence of the null raster, the image data which has been discriminated as the black character, i.e., a black text, is smoothed, and the graphic printing method is set on the other image data, whereby high-quality recording of the black text becomes possible. Further, a time necessary for the smoothing depends on an existing black data amount. Therefore, since the image data to be smoothed is limited, it becomes possible to extremely shorten the processing time for the smoothing.

The present invention is not limited to the above-described embodiments which have been explained with reference to the drawings.

As explained above, in the above-described embodiments, the multi-gradation image data is quantized and converted into a quantized pixel pattern, a smoothing portion of the image obtained by the quantizing is detected, and a contour of the quantized image is corrected by interpolating a pixel on the detected smoothing portion. In this case, since the interpolating is performed by replacing the quantized pixel pattern on the smoothing portion of the quantized image with a pixel pattern for smoothing stored in a memory means, it can be prevented that cost increases and processing speed deteriorates due to increasing in a capacity of the memory, a large number of halftones can be expressed to improve gradation or tonality, and further the contour of the image or the like is corrected to be able to suppress its indention phenomenon.

[Fourth Embodiment]

Since the structure of a recording apparatus in the present embodiment is the same as that shown in FIG. 1, an explanation thereof is omitted.

Figure 13:
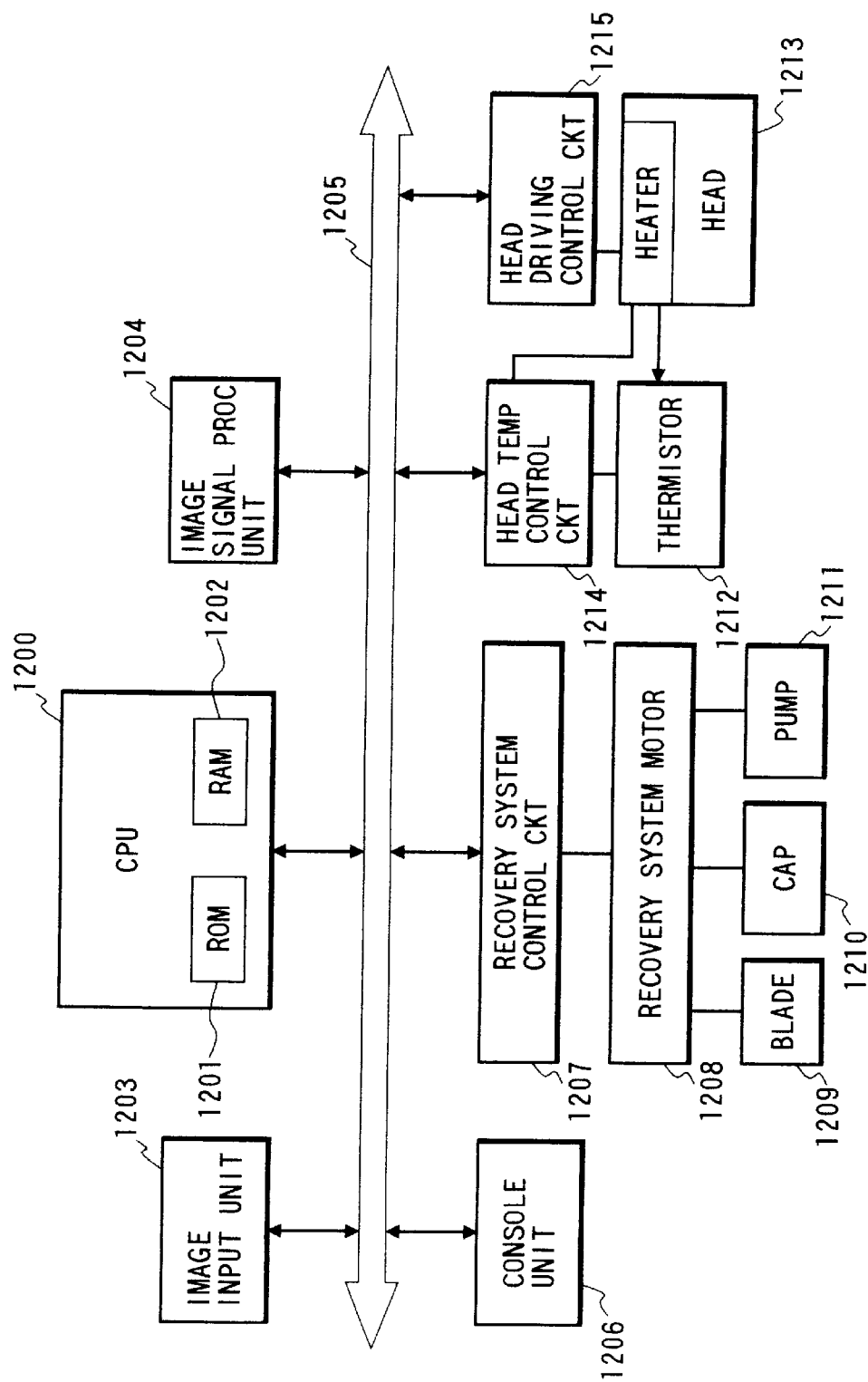
FIG. 13 is a block diagram showing controlling structure of an inkjet recording apparatus.
Figure 14A:
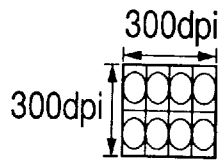
FIGS. 14A, 14B, 14C, 14D, 14E, 14F, 14G, 14H and 14I are views for explaining patterns (for C (cyan), M (magenta) and Y (yellow)) each of which is composed of only a quantized pixel in a fourth embodiment of the present invention.
Figure 14B:
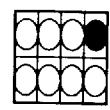
Figure 14C:
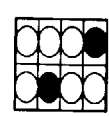
Figure 14D:
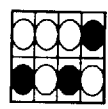
Figure 14E:
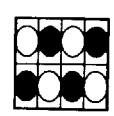
Figure 14F:
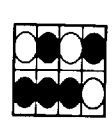
Figure 14G:
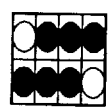
Figure 14H:
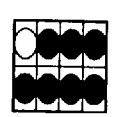
Figure 14I:

FIG. 13 is a block diagram showing the controlling structure of an inkjet recording apparatus.

In FIG. 13, components to be connected to a main bus line 1205 is roughly divided into a software-system process means and a hardware-system process means. The software-system process means includes an image input unit 1203, an image signal process unit 1204 corresponding to the image input unit, and a central processing unit (CPU) 1200 which all access the main bus line 1205 respectively. On the other hand, the hardware-system process means includes a console unit 1206, a recovery system control circuit 1207, an inkjet head temperature control circuit 1214, and a head driving control circuit 1215. The CPU 1200 which ordinarily has a read only memory (ROM) 1201 and a random access memory (RAM) 1202 renders an appropriate recording condition to input information and drives a recording head 1213 to perform the recording. The RAM 1202 previously stores a program to execute a head recovery timing chart, and renders a recovery condition such as a preliminary discharging condition or the like to the recovery system control circuit 1207, the recording head, a heater or the like in accordance with necessity. A recovery system motor 1208 drives the recording head 1213, and a cleaning blade 1209, a cap 1210 and a suction pump 1211 which are opposed to and apart from the recording head 1213. The head driving control circuit 1215 which executes a driving condition of an ink discharging electrothermal conversion body of the recording head 1213 ordinarily causes the recording head 1213 to perform preliminary discharging and recording ink discharging.

The heater is mounted on a base board of the recording head 1213 on which the ink discharging electrothermal conversion body is mounted, whereby the heater can heat and adjust ink temperature in the recording head at desired setting temperature. Similarly, a thermistor 1212 is mounted on the base board to measure the substantial ink temperature in the recording head. The thermistor 1212 may be provided outside of the recording head, i.e, not on the base board, and may be provided in the vicinity of the recording head.

In the present embodiment, an input image is represented by multi-level color image data of which resolution is 300×300 dpi. As to a color image, since it attaches importance to gradation or tonality, the color image is made expressible by a large number of halftones. Further, as to a black image, the halftone is expressed to improve the gradation and simultaneously an indention (or sawtooth) phenomenon on a contour portion such as a character or the like can be suppressed. In order to satisfy all of such specific effects, following controlling is performed in the present embodiment.

FIGS. 14A to 14I show nine kinds of quantized pixel patterns which are respectively obtained by quantizing the multi-level color image data (cyan, magenta and yellow) into nine-level data. In this case, each quantized pixel pattern includes a pixel having a (4×2) matrix and requiring a four-bit data capacity.

FIGS. 15A to 15D show four kinds of quantized pixel patterns which are respectively obtained by quantizing multi-level black image data into four-level data, and FIGS. 15E to 15P show 12 kinds of smoothing pixel patterns, in the fourth embodiment of the present invention. In this case, each quantized pixel pattern includes a pixel having a (4×2) matrix and requiring a four-bit data capacity.

FIGS. 16A to 16D show four kinds of detection patterns for detecting a smoothing portion in the fourth embodiment of the present invention. In this case, each detection pattern has a matrix of (3×3) pixel size.

FIGS. 17A to 17H show eight kinds of detection patterns for detecting the smoothing portion in the fourth embodiment of the present invention. In this case, each detection pattern is composed of the matrix of (3×4) pixel size.

FIGS. 18A to 18H show eight kinds of detection patterns for detecting the smoothing portion in the fourth embodiment of the present invention. In this case, each detection pattern is composed of the matrix of (4×3) pixel size.

Initially, the multi-level color image data is quantized into nine-level data, and converted into quantized image data composed of the pixel patterns shown in FIGS. 14A to 14I. Further, the multi-level black image data is quantized into four-level data, and converted into quantized image data composed of the pixel patterns shown in FIGS. 15A to 15D.

Since the color image data (cyan, magenta and yellow) which is composed of the nine-level quantized pixels is not smoothed, such the color image data is stored as it is.

Figure 19A:
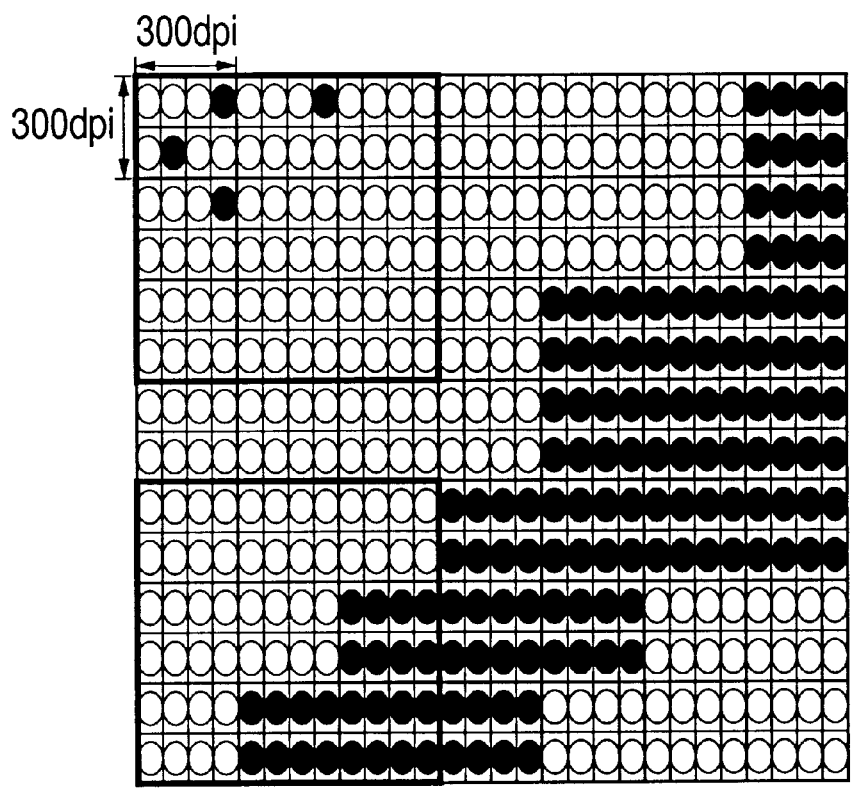
FIGS. 19A, 19B and 19C are views for explaining an image which is obtained by quantizing multi-level black image data into four-level image data in the fourth embodiment of the present invention.
Figure 19B:
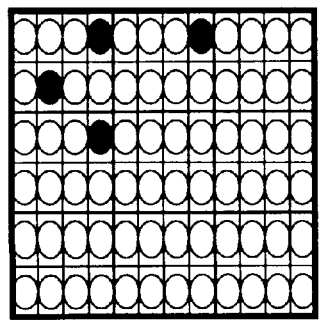
Figure 19C:
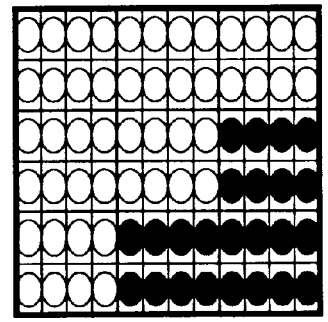
Figure 21C:
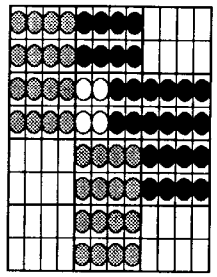
Figure 21D:
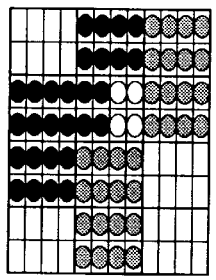
Figure 21E:
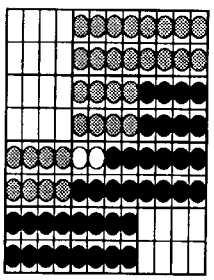
Figure 21F:
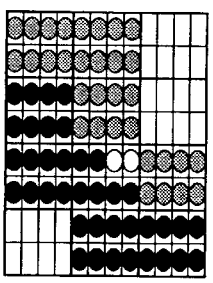
Figure 21G:
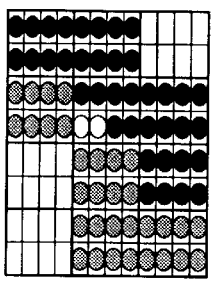
Figure 21H:
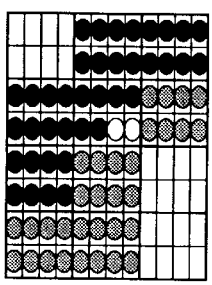

FIGS. 19A to 19C show a four-level quantized black image.

Figures 15A, 15B, 15C, 15D:
FIGS. 15A, 15B, 15C, 15D, 15E, 15F, 15G, 15H, 15I, 15J, 15K, 15L, 15M, 15N, 15O and 15P are views for explaining patterns (for Bk (black)) which are composed of the quantized pixels and pixels for smoothing in the fourth embodiment of the present invention.
Figures 15E, 15F, 15G, 15H:
Figures 15I, 15J, 15K, 15L:
Figures 15M, 15N, 15O, 15P:

The quantized black image data is checked against the four-kind detection patterns composed of the matrices having (3×3) pixel size in FIGS. 16A to 16D, the eight-kind detection patterns composed of the matrices having (3×4) pixel size in FIGS. 17A to 17H and the eight-kind detection patterns composed of the matrices having (4×3) pixel size in FIGS. 18A to 18H, as the detection patterns are displaced or shifted from an upper left portion to a lower right portion in FIGS. 17A to 17H by longitudinally one pixel and laterally one pixel every checking. However, in the matrices having (3×3), (3×4) and (4×3) pixel sizes to be checked, in a case where even one pixel includes the halftone pixel pattern in FIG. 15B or 15C, the checking against the detection patterns in FIGS. 16A to 16D, FIGS. 17A to 17H and FIGS. 18A to 18H are not performed, and the operation advances to detecting of a next matrix portion. In the (3×3) matrices surrounded by thick frames or borders in FIGS. 19A to 19C, if it is detected that the patterns in FIGS. 15B and 15C are included as in the pattern in FIG. 19B, the detecting against the detection patterns in FIGS. 16A to 16D are not performed.

FIGS. 20A to 20D, 21A to 21H and 22A to 22H are views respectively showing patterns which are obtained by, after the coincidence were detected by the detection patterns for detecting the smoothing portions shown in FIGS. 16A to 16D, 17A to 17H and 18A to 18H, replacing the quantized pixels on the pixels intended to be interpolated with the quantized pixels.

In the quantized image data, when it is detected that the pattern surrounded by the thick frame (FIG. 19C) coincides with the detection pattern (FIG. 16A), the quantized pixel pattern (FIG. 15A) on the central portion of the (3×3) matrix is replaced with the smoothed pixel pattern (FIG. 15E) as shown in FIG. 20A, and then the operation advances to the detection on the next matrix portion. In such a manner as described above, the image obtained by smoothing the entire quantized image shown in FIGS. 19A to 19C is illustrated in FIG. 23.

Figure 23:
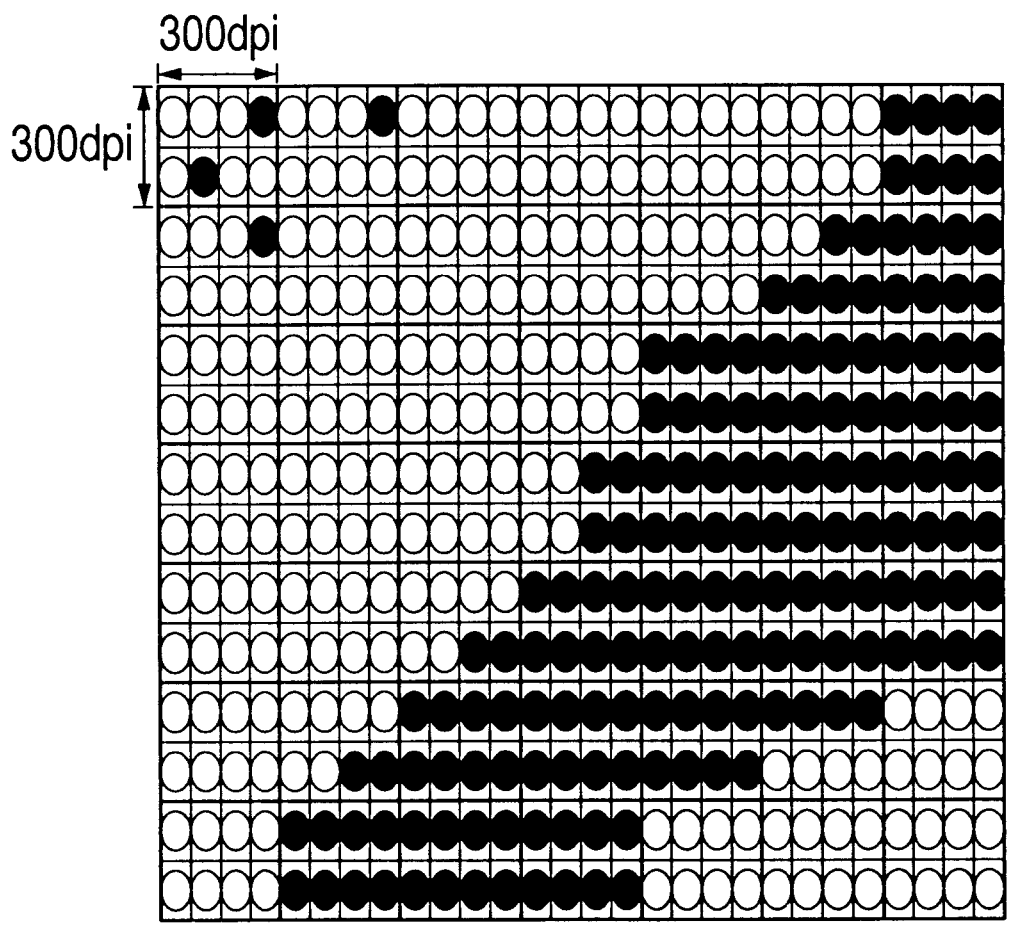
FIG. 23 is a view for explaining the image which is obtained by smoothing the four-level quantized image in FIGS. 19A, 19B and 19C in the fourth embodiment of the present invention.

That is, FIG. 23 shows the image which is obtained by smoothing the four-level quantized black image including the halftone images in FIGS. 19A to 19C. It can be understood from FIG. 23 that the image data having the resolution 300×300 dpi has been interpolated on the pixel position corresponding to the double resolution 600×600 dpi.

As above, it can be realized to record the black image in which the indention phenomenon on the contour portion of the character or the like has been suppressed by expressing the four-level quantized halftones, and the cyan, magenta and yellow color images which have been quantized up to nine levels to attach importance to the halftone expression.

In the present embodiment, the pixel information including both the quantized pixel data and the smoothed pixel data is expressed by four bits. However, such the pixel information may be expressed by the larger number of bits such as six bits, eight bits or the like, such that the matrix of one pixel is made a matrix other than (4×2) to express the more larger number of gradations and the more smoothed black character.

By such the controlling as described above, the larger number of halftones can be expressed on the color image so as to attach importance to the gradation or tonality, and the gradation or tonality can be improved on the black image by expressing the halftone and simultaneously the indention phenomenon on the contour portion of the character or the like can be suppressed. Further, since there is no need to newly provide interpolating pixel data (i.e., smoothed pixel data), the recording apparatus for realizing the high-quality image recording in a dot matrix recording system in which it can be prevented that cost increases and processing speed deteriorates due to increasing in the capacity of a memory means can be provided.

[Fifth Embodiment]

In the fifth embodiment of the present invention, an input image is represented by multi-level color image data of which resolution is 300×300 dpi. On a color image, since it attaches importance to gradation or tonality, such the color image is made expressible by a large number of halftones. Further, on a black image, if further attaches importance to halftone expressing to be able to suppress an indention (or sawtooth) phenomenon on a contour portion of a character or the like. Controlling to satisfy such specific effects will be explained hereinafter.

Also, in the fifth embodiment of the present invention, on the color image (cyan, magenta and yellow), the controlling will be explained by using the nine kinds of quantized pixel patterns each including a (4×2) matrix and requiring a four-bit data capacity.

FIGS. 24A to 24P are views for explaining 12 kinds of pixel patterns composed of quantized pixels and pixels for smoothing in the fifth embodiment of the present invention. That is, FIGS. 24A to 24E show the five kinds of quantized pixel patterns which are obtained by quantizing multi-level black image data into five-level data. In this case, each pixel has the (4×2) matrix and requires the four-bit data capacity. Further, FIGS. 24F to 24P show the 11 kinds of patterns for smoothing. The quantized pixel pattern in FIG. 24B is also used as the pixel pattern for smoothing in common, whereby FIGS. 24B and 24F to 24P together show the 12 kinds of pixel patterns for smoothing.

Also, in the fifth embodiment of the present invention, the detection patterns shown in FIGS. 16A to 16D, 17A to 17H and 18A to 18H are used.

Initially, the multi-level color image data is quantized into nine-level data and converted into the quantized image data composed of the pixel patterns shown in FIGS. 14A to 14I. Further, the multi-level black image data is quantized into the five-level data and converted into the quantized image data composed of the pixel patterns shown in FIGS. 24A to 24E.

Since the color image data (cyan, magenta and yellow) composed of the nine-value quantized pixels is not smoothed, such the color image data is recorded as it is.

The five-value quantized black image data is checked against all the detection patterns composed of the four kinds of matrices having (3×3) pixel size in FIGS. 16A to 16D, the eight kinds of matrices having (3×4) pixel size in FIGS. 17A to 17H and the eight kinds of matrices having (4×3) pixel size in FIGS. 18A to 18H, as each detection pattern is displaced or shifted by longitudinally one pixel and laterally one pixel every checking. The pixels composing the detection patterns are explained in the explanation of FIG. 25. However, in a case where the matrices of (3×3), (3×4) and (4×3) pixel sizes to be checked include even one of the halftone pixel patterns in FIGS. 24C and 24D, the detecting against the detection patterns in FIGS. 16A to 16D, 17A to 17H and 19A to 19C are not performed, and the operation advances to the detection of next matrix portion.

The patterns shown in FIGS. 20A to 20D, 21A to 21H and 22A to 22H are used also in the fifth embodiment of the present invention. The pixels composing these patterns are explained in the explanation of FIG. 25. However, only on the pattern in FIG. 20C, the quantized pixel is replaced with the smoothed pixel as shown in FIG. 25.

As above, since the quantized pixel pattern and the pixel pattern for smoothing are used in common, the more larger number of halftones can be expressed in the black image as well as the color image, and simultaneously the indention phenomenon on the contour portion of the character or the like can be suppressed.

By such the controlling as described above, the larger number of halftones can be expressed on the color image so as to attach importance to the gradation or tonality, and further the gradation or tonality can be improved on the black image by expressing the halftone and simultaneously the indention phenomenon on the contour portion of the character or the like can be suppressed. Furthermore, since there is no need to newly provide interpolating pixel data (i.e., smoothed pixel data), the recording apparatus for realizing the high-quality image recording in a dot matrix recording system in which it can be prevented that cost increases and processing speed deteriorates due to increasing in the capacity of a memory means can be provided.

[Sixth Embodiment]

In the sixth embodiment of the present invention, an input image is represented by multi-level color image data of which resolution is 300×300 dpi. On a color image, since it attaches importance to gradation or tonality, such the color image is made expressible by a large number of halftones. Also, on a black image, it attaches importance to halftone expressing to further effectively suppress an indention phenomenon on a contour portion of a character or the like. Controlling to satisfy such specific effects will be explained hereinafter.

Also, in the sixth embodiment, the controlling on the color image (cyan, magenta and yellow) is explained by using the nine kinds of quantized pixel patterns shown in FIGS. 14A to 14I each including the (4×2) matrix and requiring the four-bit data capacity. Further, the controlling on the black image is explained by using the five kinds of quantized pixel patterns shown in FIGS. 24A to 24E each having the (4×2) matrix and requiring the four-bit data capacity, and the eleven kinds of pixel patterns for smoothing shown in FIGS. 24F to 24P and one kind of quantized pixel pattern shown in FIG. 24B which is used in common as the pixel pattern for smoothing.

A printing rate (or ratio) of general documents is about 4 to 5% of a recording pixel area of a recording medium, and the printing rate of a halftone image such as a photograph or the like is about 20% or so. In the printing rate, since pixels to be smoothed (i.e., smoothing target pixels) are partial pixels constituting the contour of the character or the like, a smoothing target portion is extremely small in an entire recording area.

In the sixth embodiment, a step of detecting a smoothing portion can be remarkably made effective by primarily detecting presence or absence of the contour portion of the character or the like within the matrix of a detection pattern.

The present embodiment is explained also by using the detection patterns shown in FIGS. 16A to 16D, 17A to 17H and 18A to 18H and the patterns shown in FIGS. 20A to 20D, 21A to 21H, 22A to 22H and 25 to be replaced with the smoothed pixels after the detecting.

FIGS. 26A to 26C respectively show patterns for primarily detecting presence or absence of the contour portion of the character or the like in the sixth embodiment of the present invention.

Like the fifth embodiment, the multi-level color image data is initially quantized into the nine-level data and converted into the quantized image data composed of the pixel patterns shown in FIGS. 14A to 14I. Further, the multi-level black image data is quantized into the five-level data and converted into the quantized image data composed of the pixel patterns shown in FIGS. 24A to 24E.

Since the color image data (cyan, magenta and yellow) composed of the nine-value quantized pixels is not smoothed, such the color image data is recorded as it is.

Before the five-value quantized black image data is checked against all the detection patterns composed of the four kinds of matrices having (3×3) pixel size in FIGS. 16A to 16D, the eight kinds of matrices having (3×4) pixel size in FIGS. 17A to 17H and the eight kinds of matrices having (4×3) pixel size in FIGS. 18A to 18H as each detection pattern is displaced by longitudinally one pixel and laterally one pixel every checking (the pixels composing the detection patterns being explained in the explanation of FIG. 25), the patterns in FIGS. 26A to 26C are checked against the quantized image as the primary detecting. When coincidence is detected, the checking against the detection patterns is not performed and the primary detecting is performed on the next matrix. When no coincidence is detected in the primary detecting, then, it is detected whether or not the halftone pixel patterns in FIGS. 24C and 24D are present within the matrix, in the same manner as in the fifth embodiment. When the halftone pixel pattern is present, the checking against the detection patterns in FIGS. 16A to 16D, 17A to 17H and 18A to 18H are not performed, and the operation advances to the primary detecting on the next matrix portion.

On the other hand, when the halftone pixel pattern is not present, the quantized image data is checked against the detection patterns in FIGS. 16A to 16D, 17A to 17H and 18A to 18H to detect the smoothing portion.

By such the controlling as described above, the large number of halftones can be expressed on the color image to attach importance to the gradation or tonality, and further it can be remarkably shortened processing time to improve the gradation or tonality on the black image by expressing the halftone and simultaneously perform the smoothing to suppress the indention phenomenon on the contour portion of the character or the like. Moreover, since there is no need to newly provide interpolating pixel data (i.e., smoothed pixel data), it can be provided the recording apparatus for realizing the high-quality image recording in a dot matrix recording system in which it can be prevented that cost increases and processing speed deteriorates due to increasing in the capacity of a memory means.

As explained above, according to the fourth to sixth embodiments of the present invention, it can be suppressed that the cost increases and the processing seed deteriorates due to increasing in the memory capacity. Also, the large number of halftones can be expressed on the color image to attach importance to the gradation, and the gradation on the black image by expressing the halftone can be improved and the indention phenomenon on the contour portion of the character or the like in the black image can be simultaneously suppressed.

The above-described image processing may be realized by a hardware with a gate array or may be realized by a software of a computer (i.e., driver software of host computer).

Further, in the above-described embodiments, the dot matrix was managed as the binary dot matrix. However, e.g., in case of using deep ink and faint ink, the dot matrix may be managed as a ternary dot matrix.

Furthermore, in the above-described fourth embodiment, the interpolating is performed only on the black. However, in case of a specific original document, such the interpolating may be performed on the other color.

Although the present invention has been described above with respect to the preferred embodiments, the present invention is not limited to these embodiments but many modifications and variations are possible within the spirit and scope of the appended claims.

What is claimed is:

1. An image processing apparatus comprising:

input means for inputting multi-level image data;

quantizing means for quantizing the multi-level image data and generating N-level (N×3) image data; and converting means for converting the N-level image data, wherein the N-level image data corresponds to dot patterns in accordance with a level of the N-level image data, and said converting means converts the N-level image data based on an arrangement of the dot pattern, and wherein said converting means chances the dot pattern in accordance with an arrangement of the N-level image data.

2. An apparatus according to claim 1, wherein said converting means performs a smoothing process on an edge of an image represented by the dot patterns.

3. An apparatus according to claim 1, wherein said converting means performs the converting on a part of an image to be processed.

4. An apparatus according to claim 3, wherein the part of the image is a line image portion of the image.

5. An apparatus according to claim 1, wherein said converting means performs the converting on a part of a plurality of colors.

6. An apparatus according to claim 5, wherein the part of the colors is black.

7. An apparatus according to claim 6, wherein said converting means does not perform the converting on the other part of the colors.

8. An apparatus according to claim 1, wherein the dot pattern is a bi-level dot pattern.

9. An apparatus according to claim 1, wherein the dot pattern is used for a pseudo-halftone process.

10. An apparatus according to claim 1, further comprising image forming means for forming an image based on the dot patterns.

11. An apparatus according to claim 10, wherein said image forming means is an inkjet printer.

12. An apparatus according to claim 1, wherein the converting of said converting means is performed by a computer software.

13. An image processing method comprising the steps of:

inputting multi-level image data;

quantizing the multi-level image data and generating N-level (N×3) image data; and converting the N-level image data, wherein the N-level image data corresponds to dot patterns in accordance with a level of the N-level image data, and the converting of the N-level image data in said converting step is performed based on an arrangement of the dot pattern, and wherein said dot pattern is changed in accordance with the arrangement of said N-level image data.

\* \* \* \* \*

UNITED STATES PATENT AND TRADEMARK OFFICE
CERTIFICATE OF CORRECTION

PATENT NO.    : 6,061,145
DATED         : May 9, 2000
INVENTOR(S)   : Kanda et al.

It is certified that error appears in the above-identified patent and that said Letters Patent is hereby corrected as shown below:

Column 1,
Line 37, "plurality" should read -- plurality of --;
Line 49, "it occurs problems" should read -- problems occur --; and
Line 50, "increases and a processing time prolongs." should read -- increases cost and prolongs processing time. --.

Column 2,
Lines 10, 21, 34 and 48, "(Nx3)" should read -- (N$\geq$3) --; and
Line 28, "An another" should read -- Another --.

Column 4,
Line 67, "an" should read -- a --.

Column 5,
Line 7, "an" should read -- a --; and
Line 26, "is" should read -- are --.

Column 6,
Line 7, "occurred" should read -- from occurring --; and
Line 23, "of" should be deleted.

Column 7,
Line 53, "an" should read -- a --; and
Line 57, "image" should read -- images --.

Column 9,
Line 42, "of" should read -- or --.

Column 10,
Line 3, "If A4 longitudinal size," should read -- If printing on A4 longitudinal size, --;
Lines 27 and 33, "exits" should read -- exists --;
Line 28, "exits." should read -- exists. --;
Lines 32 and 34, "exits," should read -- exists, --;
Line 44, "exits." should read -- exists.-- and "exits," should read -- exists, --;
Line 47, "exit," should read -- exist, --.

UNITED STATES PATENT AND TRADEMARK OFFICE
CERTIFICATE OF CORRECTION

PATENT NO.    : 6,061,145
DATED         : May 9, 2000
INVENTOR(S)   : Kanda et al.

It is certified that error appears in the above-identified patent and that said Letters Patent is hereby corrected as shown below:

Column 11,
Line 6, "in a" should be deleted;
Line 18, "is" should read -- are --;
Lines 56 and 58, "to" should read -- for --; and
Line 62, "of" should be deleted.

Column 12,
Line 57, "coincidence" should read -- coincidences --.

Column 13,
Line 21, "made" should read -- made into --;
Line 22, "more" (first occurrence) should be deleted;
Line 35, "increasing" should read -- increase --; and
Line 43, "if" should read -- it --.

Column 14,
Line 33, "more" should be deleted;
Line 49, "increas-" should read -- increase --; and
Line 50, "ing" should be deleted.

Column 15,
Line 5, "used in common" should read -- commonly used --;
Line 16, "remarkably made" should read -- made remarkably --;
Line 66, "it" should be deleted; and
Line 67, "can be remarkably shortened processing time" should read -- processing time can be remarkably shortened --.

Column 16,
Line 46, "(Nx3)" should read -- $(N \geq 3)$ --; and
Line 53, "chances" should read -- changes --.

Column 17,
Line 3, "claim 6," should read -- claim 5, --.

UNITED STATES PATENT AND TRADEMARK OFFICE
CERTIFICATE OF CORRECTION

PATENT NO. : 6,061,145
DATED : May 9, 2000
INVENTOR(S) : Kanda et al.

It is certified that error appears in the above-identified patent and that said Letters Patent is hereby corrected as shown below:

Column 18,
Line 5, "(Nx3)" should read -- (N$\geq$3) --.

Signed and Sealed this

Twenty-fifth Day of October, 2005

JON W. DUDAS
*Director of the United States Patent and Trademark Office*